United States Patent [19]

Byrne et al.

[11] Patent Number: 4,670,696

[45] Date of Patent: Jun. 2, 1987

[54] VARIABLE SPEED VARIABLE RELUCTANCE ELECTRICAL MACHINES

[75] Inventors: John V. Byrne, Dalkey; Francis McMullin, Ennis; Francis Devitt, Dublin; Jeremiah O'Dwyer, Naas, all of Ireland

[73] Assignee: Kollmorgen Technologies Corporation, Dallas, Tex.

[21] Appl. No.: 789,038

[22] Filed: Oct. 18, 1985

[30] Foreign Application Priority Data

Oct. 19, 1984 [IE]  Ireland ................................. 2697/84
Apr. 16, 1985 [IE]  Ireland .................................. 956/85

[51] Int. Cl.$^4$ ........................ H02K 19/24; H02P 7/40
[52] U.S. Cl. .................................... 318/701; 318/138; 318/700; 310/168
[58] Field of Search .................. 318/138, 254, 254 A, 318/439, 696, 701, 700; 310/46, 68 R, 156, 157, 177, 218, 261, 168

[56] References Cited

U.S. PATENT DOCUMENTS

| | | | |
|---|---|---|---|
| 2,848,632 | 8/1958 | Keene | 310/261 X |
| 3,062,979 | 11/1962 | Jarret et al. | 310/168 |
| 3,091,728 | 5/1963 | Hogan et al. | 318/254 X |
| 3,171,049 | 2/1965 | Jarret et al. | 310/168 |
| 3,305,717 | 2/1967 | Weiss | 318/254 |
| 3,521,098 | 7/1970 | Jesse | 310/163 |
| 3,956,678 | 5/1976 | Byrne et al. | 318/138 |
| 4,028,598 | 6/1977 | Bergmans | 318/254 A X |
| 4,186,316 | 1/1980 | Singh | 310/261 X |
| 4,214,194 | 7/1980 | Horning | 318/696 |
| 4,368,411 | 1/1983 | Kidd | 318/254 |
| 4,447,771 | 5/1984 | Whited | 318/254 X |
| 4,500,824 | 2/1985 | Miller | 318/254 X |
| 4,528,486 | 7/1985 | Flaig et al. | 318/254 |

FOREIGN PATENT DOCUMENTS

| | | | |
|---|---|---|---|
| 53-124706 | 10/1978 | Japan | 318/254 |
| 57-68697 | 4/1982 | Japan | 318/254 |
| 58-109000 | 6/1983 | Japan | 318/254 |
| 1054924 | 1/1967 | United Kingdom . | |
| 1055886 | 1/1967 | United Kingdom . | |
| 1107266 | 3/1968 | United Kingdom . | |
| 1105767 | 3/1968 | United Kingdom . | |
| 1175512 | 12/1969 | United Kingdom . | |
| 1185828 | 3/1970 | United Kingdom . | |
| 1202693 | 8/1970 | United Kingdom . | |
| 1292111 | 10/1972 | United Kingdom . | |

(List continued on next page.)

OTHER PUBLICATIONS

IEE Conference Publication, vol. 136, 1976, pp. 93–96; J. V. Byrne et al., "Characteristics of Saturable Stepper & Reluctance Motors".

Proc. IEE Conference on Variable Speed Drives, Sep. 1979; Bolton and Pedder: "Low—Cost, Reluctance Drive System for Low Power, Low Speed Application".

(List continued on next page.)

Primary Examiner—William M. Shoop, Jr.
Assistant Examiner—Bentsu Ro
Attorney, Agent, or Firm—Morgan & Finnegan

[57] ABSTRACT

A drive system includes a reluctance motor, driving a load. The motor has stator and rotor poles and magnetizing windings for each stator pole. The airgap is small so that saturation occurs during pole overlap, and the poles are constructed so that there is torque overlap between phases as successive phases are energized during rotor rotation. A sensor provides a rotor position input to a reference waveform generator. The output of the generator is determined by rotor position and is applied to a power converter through a current controller. Accordingly the waveform generator establishes a relative magnitude for motor phase current for every position of the rotor during the period of energization of a motor phase. A further input may be applied to the system to determine the absolute magnitude of the phase current, subject to the waveform pattern established by the generator. The rotor poles may be skewed to modify the static torque versus rotor angle characteristic of the motor, the skew being between one-quarter and one-half of rotor pole arcuate extent.

23 Claims, 31 Drawing Figures

FOREIGN PATENT DOCUMENTS

| | | |
|---|---|---|
| 1314901 | 4/1973 | United Kingdom . |
| 1321110 | 6/1973 | United Kingdom . |
| 1422522 | 1/1976 | United Kingdom . |
| 1422523 | 1/1976 | United Kingdom . |
| 1488161 | 10/1977 | United Kingdom . |
| 1500798 | 2/1978 | United Kingdom . |
| 1525384 | 9/1978 | United Kingdom . |
| 1579121 | 11/1980 | United Kingdom . |
| 2047479A | 11/1980 | United Kingdom . |
| 2050071A | 12/1980 | United Kingdom . |
| 2082847A | 3/1982 | United Kingdom . |
| 2082847B | 3/1982 | United Kingdom . |
| 2105933A | 3/1983 | United Kingdom . |

OTHER PUBLICATIONS

International Conference on Electrical Machines, Athens, Sep. 1980; Lawrenson et al: "Switched Reluctance Motors for Traction Drives".

Power Division of the Institution of Electrical Engineers, Second International Conference on Small and Special Electrical Machines, Sep. 1981; Chatratana, Bolton and Pedder: "Investigations into Small Single—Phase Switched Reluctance Motors".

IEE Proceedings, vol. 131, No. 2, part B; Mar. 1984, pp. 51–60, Old Working Surrey, G.B., P. H. Chappell et al, "Microprocessor Control of a Variable Reluctance Motor".

IEE International Conference on Power Electronics and Variable—Speed Drives, May 1984; Ray, Lawrenson et al; "Industrial Switched Reluctance Drives—Concepts and Performance".

Motor Con, Oct. 1985; Torrey and Lang: "Progress on the Development of a 60—kw Variable—Reluctance Motor Drive for Electric Vehicle Propulsion".

"Electric Machinery"; Third Edition; Fitzgerald et al; McGraw—Hill 1961, pp. 536–539.

"Electrical Machines and Their Applications", Second Edition; Hindmarsh; Pergamon 1970, pp. 506–509.

0 096 390, 12/83, EPO (European Patent Application).

WO 83/00957 (PCT), 3/83.

Byrne et al., "A High Performance Variable Reluctance Drive: A New Brushless Servo", Motor—Con, Oct. 1985, Proceeding, pp. 147–160.

VARIABLE SPEED VARIABLE RELUCTANCE ELECTRICAL MACHINES

BACKGROUND OF THE INVENTION

1. Field of the Invention

The present invention relates to power drive systems for or incorporating variable reluctance electrical machines and to variable reluctance electrical machines for such systems. More particularly, the invention relates to power drive systems for doubly-salient variable or switched reluctance motors and to reluctance motors of this kind for such power drive systems. The present invention also relates to a construction of variable reluctance machine operable as a generator.

2. Description of the Prior Art

Variable reluctance motors are among the oldest of electrodynamic machines, but their industrial application was for many years inhibited by the lack of availability of suitable switching means for reliable progressive sequential energisation of the stator poles to bring about rotation of the rotor. The lengthy history of relative lack of success in adapting variable reluctance electrical machines for use for higher power drives is emphasized in the discussion to the papers presented to the IEE Power Division Professional Groups P1 and P6 on Dec. 8, 1980 PROC., Vol. 128, Pt. B, No. 5, SEPTEMBER 1980, pp 260–268, where reference was made to the earliest such motors, designed in 1842 for railway use and demonstrably ancestors of today's machines. Reference was also made to a subsequent machine of 1851. Several contributors connected on the curious circumstances that machines of this kind should for so long have failed to find a commercial role, and much of the discussion revolved around the difficulty of successfully applying reluctance motors to an everyday industrial role.

Even the undoubted advances discussed and described at that Conference do not, however, appear to have brought about widespread use of variable reluctance motors in substitution for conventional industrial AC and DC units.

While variable reluctance motors have been used commercially in more recent times, in the form of stepping motors, the stepping motor is fundamentally a digital device controlled by pulsed inputs which yield predetermined output steps. The development of microprocessor control systems has enhanced the utility of stepping motor drives, but nonetheless these motors essentially remain suited to positioning applications and are not generally suitable for delivering significant power outputs. However the inherently high efficiency of the reluctance motor has caused the increasing availability of high power semiconductor switching devices in recent years to lead to increasing interest in the possibility of applying variable reluctance motors to higher power drives in industrial applications, while attention has also been drawn to the advantages of operating variable reluctance motors in the saturated mode, in which mode the reluctance motor is especially efficient in converting electrical energy into mechanical work.

Torque is generated in a reluctance motor when a rotor pole moves relative to a stator pole from a position of maximum reluctance into a pole overlap configuration in which the reluctance is a minimum. In a practical construction, a variable reluctance motor typically has a number of paired rotor poles and a greater number of paired stator poles. Thus there is a plurality of possible stable minimum reluctance positions, in each of which one pair of rotor poles is aligned with one pair of stator poles. Each stator pole pair is provided with energizing windings and when a particular pair is energized, a corresponding pair of rotor poles will move into alignment with those stator poles, thereby developing torque. If energization is then switched from that pair of stator windings to an appropriate other pair, the rotor may then be rotated further through an angle determined by the relationship between the numbers of rotor and stator poles to a new stable minimum reluctance position, and so on by further sequential energization. In particular when intended for a stepping drive, the machine may incorporate permanent magnets so that a force tending to hold the rotor in a specific displacement relative to the stator exists, even in the absence of energizing currents. Alternatively the stator poles may be magnetized only when exciting currents are present. In the absence of permanent magnets, currents in the reluctance motor are unipolar, i.e. they only flow through the windings in one direction, and the rotational direction of the machine is reversed by changing the order in which the windings are energized during each revolution of the rotor, rather than by reversing the direction of current flow through these windings. Accordingly for one direction of rotation, the stator pole windings are energized so that the rotor poles move into alignment with appropriate stator poles from one circumferential side of the stator poles. For the other direction of rotation, the sequence of stator winding excitation is such that the rotor poles move into alignment with stator poles from the other circumferential side of the stator pole.

In a machine with a multiplicity of poles therefore, the rotor may rotate to bring a pair of rotor poles into a configuration of minimum reluctance with a particular pair of stator poles from either of two directions, so that each pair of rotor poles has two possible positions of maximum reluctance relative to a particular stator pole pair, one such position being to one circumferential side of that pole pair and the other maximum reluctance position lying to the other circumferential side of the stator poles in question. Accordingly for a particular direction of rotation, the sequence of energization of the stator pole windings is that which will induce rotation of the rotor in the desired direction to bring rotor poles into a minimum reluctance relationship with stator pole pairs from the appropriate circumferential side of the stator poles. Furthermore since each stator pole winding pair or phase may be energized to bring about either forward or reverse rotation, thereby also developing either forward or reverse torque at the motor drive shaft, when therefore the windings are undergoing sequential energization to produce rotation in a selected direction, they should not be energized to any significant extent during the periods while rotor poles are moving away from their minimum reluctance dispositions in alignment with stator poles towards their maximum reluctance dispositions in relation to these stator poles, from which their displacement towards these poles begins for rotation in the opposite direction. Energization at this time will develop an opposing torque, acting against the torque now being developed during the continuing rotation of the rotor by the movement of a further pair of rotor poles into a minimum reluctance configuration with the next pair of stator poles now being energized in due turn for this continuing rotation.

Thus each electrical cycle for each stator pole winding phase, i.e. typically a pair of stator pole windings, is distinguished by a half-cycle during which the phase is energized to produce torque to rotate the rotor in the selected direction, i.e. forward or reverse, and a further half-cycle during which the phase windings remain de-energized so that substantially no torque is developed which would tend to oppose the desired direction of rotor rotation. Reversal of the direction of rotation of the rotor involves therefore interchange of the energized and quiescent periods of the electrical cycle for each motor phase.

A variable reluctance motor may have typically three or four phases and during the period of excitation of each phase, one or more pairs of stator pole windings are energized for the appropriate half-cycle. The torque developed during the movement of a particular pair of rotor poles relative to an appropriate pair of stator poles may be plotted experimentally against the rotor angle, while the stator pole windings are energized with a DC current, to produce a so-called static torque/rotor angle characteristic. The phase torque output of the machine during operation may then be derived by plotting torque against rotor angle for the specific value of current with which each phase is energized at each angular position of the rotor. When the phases are energized with constant currents in an on-off manner, as is conventional in stepping motor practice, the phase torque output of the machine will have essentially the same shape as the static torque characteristic for each phase for the half-cycle appropriate to the desired direction of rotation. By suitable design of the machine in terms of rotor and stator dimensions, the start of the torque-producing region or half-cycle of each incoming phase may be arranged to overlap that of the outgoing preceding phase so that there is continuity of torque throughout the rotation of the motor by virtue of this phase torque overlap. Net output torque at the shaft is then computed by adding the phase torques. Depending on the precise shapes and angular extents of the phase torques, this net torque may exhibit a significant ripple during torque transition between phases.

In the application of known stepping motor systems to variable speed drives, it has been found that torque ripple during phase to phase transitions, is significant and may be such as to render the motor unacceptable for such drives. In such systems, the static torque against rotor angle characteristic for a single phase of a saturable variable reluctance motor during a rotor displacement from a maximum reluctance position to a minimum reluctance position is typically distinguished by a very rapid initial rise in torque as pole overlap commences, followed by a period during which torque remains substantially constant while pole overlap progresses towards full overlap, and the characteristic terminates with a roll-off portion during which torque drops significantly as full overlap is achieved and the relevant rotor pole moves into a disposition of minimum reluctance. Further displacement of the rotor relative to the stator then leads to the poles moving out of overlap, and the static torque characteristic of this displacement is substantially an inverse mirror image, about the zero-torque full overlap condition, of that for the displacement into the overlap condition, the direction in which the torque is exerted being reversed. This negative torque developed by the further relative displacement of the rotor and stator poles from their minimum reluctance relationship terminates with arrival of the rotor in a new position of maximum reluctance, from which a further complete cycle may commence, with displacement of the rotor pole into overlap with a further stator pole taking place. While the magnitude of the peak static torque will vary depending on the level of energizing current, the general shape of this characteristic remains the same for all levels of excitation. Accordingly regardless of the extent of the overlap between successive phase torques and the levels of the exciting currents, each incoming phase torque-generating half-cycle has a region during which torque rises very rapidly and typically much more rapidly than the rate at which torque produced by the torque-generating half-cycle of the outgoing phase decays, so that the net machine torque is not smooth and the phase to phase torque transfers are distinguished by substantial torque fluctuations or ripple.

Apart from its deleterious effect on torque smoothness during transition between phases, this rapid torque rise experienced in many known reluctance motors at the start of pole overlap, especially when the windings are energized with constant or stepform energizing currents, also frequently leads to generation of vibration and noise in operation of the motor. The rapidly rising force at the start of the torque/angle characteristic has the same effect as an impulsive "hammer-type" blow. Structural resonance in the motor may be triggered by the repeated torque impulses, leading to inter alia stator bell mode vibration in which the inward attraction of diametrically opposite stator poles produces an electrical deformation of the stator. As this deformation progresses around the stator, a bell-like resonance is produced. Other modes of resonance may include a rotor radial mode arising from deflection or distortion of the rotor under the electrical forces, bearing rattle which may arise out of any looseness in the fit of the bearings on the rotor shaft, and a torsional mode excited by the rotation-inducing torsional forces acting on the rotor. Any or all of these modes of resonance may be present and result in noise and vibration. While they may be damped by such known methods as the use of heavier bearings and structures than are required by electromagnetic considerations alone, such a solution is not fundamentally a satisfactory answer to the vibration and resonance problems frequently experienced in these machines.

The achievement of both torque smoothness and freedom from noise and vibration in operation is dependent on the complex static-torque versus rotor angle characteristic of the variable reluctance motor but torque smoothness and freedom from noise and vibration are not necessarily cured by the same remedies, and in particular a motor in which the characteristics are such that the torque ripple at phase torque transitions is perhaps acceptable for certain drive purposes may not necessarily be distinguished by silent and vibration-free operation.

Variable reluctance machines for use in power drives have been described in U.S. Pat. Nos. 3,062,979 and 3,171,049 of Jarret and U.S. Pat. No. 3,956,678 of Byrne and Lacy. In U.S. Pat. No. 3,062,979 of Jarret, the saturation induction in the rotor teeth magnetic material of a variable reluctance electric machine is reduced to between 15 and 85% of the maximal induction selected for the magnetic circuit material of the machine, with the purpose of allowing magnetic fields of relatively large strength to be developed in the gaps adjacent the polar areas without excessive losses and to promote a high ratio of output power of the machine to its weight. In order to achieve this object, the rotor teeth are constituted by alternate sheets of magnetic material interspersed with non-magnetic material such as lamina-shaped airgaps. Jarret's U.S. Pat. No. 3,171,049 describes a development of the machine of the earlier U.S. Pat. No. 3,062,979 in which the rotor is divided into two co-axial half-rotors axially spaced apart and secured to each other and to a common rotatable shaft. The stator is similarly divided and the windings are then connected in the form of a four-impedance bridge in order to achieve effective decoupling of the AC and DC circuits of the machine and thereby an improved level of machine efficiency. In another aspect the machine of this patent specification is shown to have a plurality of rotor teeth, each of which is defined by a number of sectoral fanned-out portions, so that the movement of the tooth past a stator pole is accompanied by a stepwise change in magnetic characteristic and the machine may be operated substantially with sine-wave current. The purpose of this arrangement is to alter the waveform of the induced voltage from the substantial rectangular shape induced by the movement of a rotor tooth past a stator pole in those constructions of machine in which the rotor teeth have constant magnetic properties throughout their angular development. In the particular constructions shown in U.S. Pat. No. 3,171,049, each tooth is defined by a plurality of groups of sectoral projections, the groups being spaced apart in the axial direction by air gaps and each tooth being defined by four laminations in a fanned array so that each step in the stepwise change of magnetic characteristic involves a stepform incremental increase or decrease of one fifth, as each tooth lamination comes beneath or moves away from a stator pole. In U.S. Pat. No. 3,956,678, stepping motor techniques are described in which simplification of the drive and a gain in specific output and efficiency are achieved by constructions ensuring maximum saturation of magnetic flux at the stator pole faces, the airgaps between associated stator and rotor pole faces being minimal. A rotor pole structure is described in which a leading part of each rotor pole surface is undermined by deep trapezoidal slots to reduce the gap flux density compared with the unslotted pole surface portions, the objective being to extend the mechanical displacement of the rotor over which a uniform rate of flux increase occurs to correspond to one stator pole pitch, thereby also providing torque continuity with a two-phase configuration.

None of these prior art documents contain any comprehensive consideration of the problems of torque ripple and noise generation discussed above. While the Jarret patent specifications disclose a number of features relating to reluctance motor torque in general, the alleged improvement in torque output achieved by reducing the packing factor of the laminated steel in the pole face in the arrangement of U.S. Pat. No. 3,062,979 appears to be based on a misconception, since the mean torque is in fact always reduced by such measures, although reducing the packing factor in the pole face does in some cases offer the possibility of altering the shape of the static torque against angle diagram at constant current with little if any significant loss of static mean torque. In an arrangement described by Byrne and Lacy in a paper entitled "Characteristics of Saturable Stepper and Reluctance Motors" delivered to the Small Machines Conference in 1976 (IEE Conf. Publ. 136, 1976 pp 93–96), an echelon array of rotor stampings of graded arc length is used, by virtue of which an improved degree of torque uniformity is achieved over the step length of 90°. By virtue of the echelon array, the constriction cross-section in the overlap between stator and rotor increases linearly over the 90° step length arc.

In the classis stepper motor such as is frequently used in computer peripherals and also to some extent in numerically controlled machine tools for positioning movements, the problems of torque transitions and torque ripple are not of major consequence, since the motor is essentially used only for digital positioning purposes in which its incremental operation or stepping advance between positions of minimum reluctance of the rotor is employed, and it is not called upon to develop significant levels of power. Thus, the exact shape of the static torque versus angle characteristic is not of major consequence, since the power levels in question are modest and the impulsive force generated by the initial sharp increase in torque as overlap commences is sufficiently small in absolute terms as not to be of great significance insofar as noise and vibration generation is concerned. In addition, it has been observed that in for, example, a 200-step permanent magnet stepping machine, in which the stator and rotor teeth are defined by semicircular cutouts in the stator pole faces and the rotor periphery respectively, these cutouts defining the gaps between the teeth, the successive torque versus angle characteristics of the phases tend to be smoothed and may attain an approximately sinusoidal shape. Since in a stepper motor of this kind, the number of teeth is large relative to the dimensions of the rotor and stator, the airgap between the rotor and stator is also relatively large in terms of the dimensions of the individual teeth, and it is believed that this may contribute to the smoothed shape of the torque-angle curve. In a technique known as microstepping, a stepper motor of this kind may be fed with individually controlled currents in its individual phases so as to produce null positions additional to those arising from the rotor positions of minimum reluctance. In one such technique, the phase currents are applied in the form of sine and cosine waves dependent on the angle of electrical phase displacement. The system uses a counter which accepts a series of input signals in the form of pulses and generates digital numbers representing the sine and cosine values, look-up tables in the form of ROMs being usable for this conversion. The resulting reference signals are used to control the current by means of a chopper drive.

BRIEF SUMMARY OF THE INVENTION

It is an object of the present invention to provide a power drive system for or incorporating a variable reluctance motor in which transition between phase torques is achieved without substantial variation in net machine torque output. It is a further object of the invention to provide a power drive system for a variable reluctance machine in which structural resonance of the machine in operation is limited by control of the resonance-exciting forces developed during operation of the machine. Still further objects of the present invention include the development of a variable reluctance machine in which the ratio of torque to inertia is high and the provision of a variable speed variable reluctance machine capable of economical manufacture. According to a first aspect of the invention, there is provided a drive system comprising a saturable variable reluctance electrical motor, said motor comprising a stationary or driving member having a plurality of salient driving poles, a magnetizing winding for each driving pole, a plurality of airgaps, and a movable or driven member having a plurality of salient driven poles, the number of driven poles being less than the number of driving poles, the airgap between each driving pole and a driven pole positioned in alignment therewith being small relative to the dimensions of the poles transverse to said airgap and at least the driven poles being formed so that in operation of the motor magnetic saturation occurs substantially in the region of the mechanically variable interface or overlap between the driving and driven poles, and the extents and dispositions of the driven poles being related to those of the driving poles so that in operation of the motor the force-producing increment of driven member displacement resulting from the mechanical interface or overlap of each driven pole with a driving pole overlaps the force-producing increment of driven member displacement resulting from the overlap of another driven pole with a further driving pole, and the system also comprising driven member position-sensing means for generating at least one signal, the instantaneous value of which is dependent on the position of the driven member, and power supply means including a voltage source or sources connectible across the driving pole windings, said windings being connectible across said source or a said source in a predetermined sequence during driven member displacement and each driving pole winding being thus connectible for a predetermined increment of driven member displacement, and the power supply means also including means for regulating the instantaneous magnitude of the current in a driving pole winding when connected to said source or a said source, said current-regulating means being responsive to the or a said driven member position-dependent signal of the driven member position-sensing means to regulate said current magnitude so that the instantaneous value of said current set by said regulating means at any position of the driven member within said increment of driven member displacement during which the winding is connectible to said source or a said source relative to its value at any other said position is substantially determined by the instantaneous position of the driven member.

While the present invention is for the most part described in relation to rotational embodiments in the following text, the principles embodied in it may also be applied to a linear geometry of motor, as set out in the foregoing definition of the first aspect of the invention, in which a substantially planar driven member or "rotor" is displaceable past a fixed member or "stator" unit of the linear motor. A current control feature may be applied to such a construction in precisely the same manner as subsequently set out herein for rotating machines, it being understood that the terms "stator" and "rotor" as applied to a linear motor equate to or represent a driving member and driven member respectively, and references to the circumferential and axial directions in a rotary construction correspond to the direction of driven member displacement and a direction transverse to that displacement in a linear motor.

In a rotary constructions according to the first aspect of the invention, there is provided a drive system comprising a saturable variable reluctance electrical motor, said motor comprising a stator having a plurality of salient stator poles, a magnetizing winding for each stator pole, and a rotor having a plurality of salient rotor poles, the number of rotor poles being less than the number of stator poles, the radial airgap between each stator pole and a rotor pole positioned in alignment therewith being small relative to the dimensions of the poles transverse to said airgap and at least the rotor poles being formed so that in operation of the motor magnetic saturation occurs substantially in the region of the mechanically variable interface or overlap between the stator and rotor poles, and the arcuate extents and dispositions of the rotor poles being related to those of the stator poles so that in operation of the motor the torque-producing angular increment of rotor rotation resulting from the mechanical interface or overlap of each rotor pole with a stator pole overlaps the torque-producing angular increment of rotor rotation resulting from the overlap of another rotor pole with a further stator pole, and the system also comprising rotor position-sensing means for generating at least one signal, the instantaneous value of which is dependent on the angular position of the rotor, and power supply means including a voltage source or sources connectible across the stator pole windings, said windings being connectible across said source or a said source in a predetermined sequence during rotor rotation and each stator pole winding being thus connectible for a predetermined angular increment of rotor rotation, and the power supply means also including means for regulating the instantaneous magnitude of the current in a stator winding when connected to said source or a said source, said current-regulating means being responsive to the or a said rotor position-dependent signal of the rotor position-sensing means to regulate said current magnitude so that the intantaneous value of said current set by said regulating means at any angular position of the rotor within said angular increment of rotor rotation during which the winding is connectible to said source or a said source relative to its value at any other said angular position is substantially determined by the instantaneous angular position of the rotor.

By thus controlling the relative instantaneous magnitude of the current input to typically, each pair of stator phase windings of a machine as they are sequentially energized, in accordance with the angular position of the rotor within the appropriate angular segment of rotor rotation, the torque developed by each phase of the machine during its period of energization may be closely controlled so that the detrimental effects of rapid torque rise at the start of pole overlap and torque ripple where the torques of successive phases overlap may be minimized. For example, during torque overlap, the current in the outgoing phase may be regulated so that the torque of that phase is reduced at a rate such that the torque developed by the outgoing phase taken together with the torque being developed by the incoming phase amounts to a substantially constant net machine torque output. The control of torque achievable by current regulation may also significantly reduce or substantially eliminate the "hammer-blow" described above, which is typically experienced at the start of pole overlap, and thereby also improve machine performance in terms of noise and vibration.

In a second aspect, the invention provides a saturable variable reluctance electrical machine comprising a stationary or driving member having a plurality of salient driving poles, a winding for each driving pole, a movable or driven member having a plurality of driven poles, the number of driven poles being less than the number of driving poles, the airgap between each driving pole and a driven pole positioned in alignment therewith being small relative to the dimensions of the poles transverse to said airgap and at least the driven poles being formed so that in operation of the machine magnetic saturation occurs substantially in the region of the mechanically variable interface or overlap between the driving and driven poles, the extents and dispositions of the driven poles being related to those of the driving poles so that in operation of the machine the force-producing increment of driven member displacement resulting from the mechanical interface or overlap of each driven pole with a driving pole overlaps the force-producing increment of driven member displacement resulting from the overlap of another driven pole with a further driving pole, each driven pole and each driving pole having edge regions spaced apart in the direction of relative displacement of the driven and driving members, said spacing of said edge regions being substantially constant throughout the extent of the pole in a direction transverse to said direction of relative displacement and each said edge region being defined in said transverse direction of the pole by a succession of edge regions portions, each said edge region portion being displaced in said direction of relative displacement with respect to the or each adjacent edge region portion of said edge region, each said edge region portion being advanced in said direction of relative displacement with respect to the preceding edge region portion or each said edge region portion being set back in said direction of relative displacement with respect to the preceding edge region portion so that said edge region is skewed relative to said direction of relative displacement, and the spacing in said direction of relative displacement between the edge region portion at one transverse end of one of said edge regions of the pole and that at the other transverse end of the same edge region being between one quarter of the constant extent of the pole in said direction of relative displacement and a value equal to said extent.

In a rotary construction, a saturable variable reluctance electrical machine according to this second aspect of the invention comprises a stator having a plurality of salient stator poles, a winding for each stator pole, a rotor having a plurality of rotor poles, the number of rotor poles being less than the number of stator poles, the radial airgap between each stator pole and a rotor pole positioned in alignment therewith being small relative to the dimensions of the poles transverse to said airgap and at least the rotor poles being formed so that in operation of the machine magnetic saturation occurs substantially in the region of the mechanically variable interface or overlap between the stator and rotor poles, the arcuate extents and dispositions of the rotor poles being related to those of the stator poles so that in operation of the machine the torque-producing angular increment of rotor rotation resulting from the mechanical interface or overlap of each rotor pole with a stator pole overlaps the torque-producing angular increment of rotor rotation resulting from the overlap of another rotor pole with a further stator pole, each rotor pole and each stator pole having respective circumferentially spaced apart edge regions, the circumferential spacing of said edge regions being substantially constant throughout the axial extent of the pole and each said edge region being defined in the axial direction of the pole by a succession of edge region portions, each said edge region portion being circumferentially displaced relative to the or each adjacent edge region portion of said edge region, the circumferential displacement of each said edge region portion being in the circumferential direction relative to the preceding edge region so that said edge region is skewed relative to the axis of rotation of the machine, and the circumferential displacement of the edge region portion at one axial end of one of said edge regions of the pole relative to that at the other axial end of the same edge region being between one quarter of the constant arcuate extent of the pole and a value equal to said arcuate extent.

In variable reluctance machines according to the present invention, the form or structure of at least the driven poles is of importance, in addition to minimization of the airgap, in ensuring that in operation of the machine, magnetic saturation occurs substantially in the region of the overlap between driven and driving poles. The pole shaping which is a particular feature of the invention in its second aspect may be arranged to cause the reluctance of the machine to vary in a predetermined and controlled manner during the initial overlap of a pair of rotor poles with a pair of stator poles and thereby modify the shape of the static torque/rotor angle characteristic so as to reduce in particular the rapid rate of rise of torque normally experienced at the commencement of pole overlap. The rates of change of phase torque thus achievable facilitate the extension of the torque-generating portion of each phase while still providing relatively smooth transitions between the phases. Pole shaping also facilitates phase winding current control, in that the phase currents may follow a more regular pattern of change between successive rotor positions, thus enabling the required current waveshapes to be more readily provided, especially at high rotational speeds.

The present invention relates particularly to variable reluctance machine structures in which the polefaces of at least the driving poles are substantially smooth or continuous, i.e. they are undivided. In this, polefaces of machines according to the invention differ from the multi-toothed arrangements used in particular for stepping or micro-stepping motors. Thus, in constructions of machine according to either of the foregoing aspects of the invention, the poleface of at least each driving or stator pole may suitably define a substantially continuous surface facing said airgap. In drive systems according to the invention, said current-regulating means is preferably responsive to said rotor-position dependent signal to regulate said current magnitude so that successive instantaneous values of said current during an initial portion of said angular increment of rotor rotation during which the winding is connectible to said source or a said source increase progressively with progressive rotation of the rotor and successive instantaneous values of said current during a terminal portion of said angular increment decrease progressively with said progressive rotation. In this way, the rate of increase of the torque developed by each incoming phase may be matched to the rate of decrease of the torque produced by each outgoing phase so that a substantially smooth torque transition may be achieved for substantially any shape of static torque/rotor angle characteristic.

Said current-regulating means may be responsive to said rotor-position dependent signal to regulate said current magnitude so that the rate at which successive instantaneous values of said current decrease during said terminal portion of said angular increment of rotor rotation is substantially the same as the rate of increase of successive instantaneous current values during said initial portion and the succession of instantaneous current values over said angular increment of rotor rotation substantially defines a substantially symmetrical current waveshape extending over said angular increment. This feature can be especially advantageous for bi-directional operation of a reluctance motor in that the current-regulating means may apply similar current waveshapes to the windings irrespective of the direction of rotation, thus facilitating a particularly advantageous realization of the power supply means.

Said current-regulating means may also be responsive to said rotor-position dependent signal to regulate said current magnitude so that successive instantaneous values of said current during said initial portion of said angular increment of rotor rotation substantially define the rising current region of a substantially sinusoidal current halfwave and successive instantaneous values of said current during said terminal portion of said angular increment substantially define the falling current region of a substantially sinusoidal current halfwave. The particular advantage of this feature resides in the relative ease with which sinewaves or parts of sineways may be produced or synthesized, especially at high rotational speeds, compared with other waveshapes. In the application of the system of the invention to a three-phase motor, waveshapes having initial and terminal portions, each of which is part of a sinewave, may be used, with the waveshapes having a constant current portion extending between the peak value of the initial rising current region of the waveshape and the peak value with which the terminal falling current region commences.

An intermediate portion of said angular increment of rotor rotation may be interposed between said initial and terminal portions. The angular increment of rotor rotation may thus be considered as being made up of three portions, an initial portion, an intermediate portion and a terminal portion, and said current magnitude may remain substantially constant during said intermediate portion of angular rotation. Alternatively, the initial portion may lead directly into the terminal portion without the interposition of an intermediate portion. In a particularly favoured embodiment of drive system according to the invention, said current-regulating means may be responsive to said rotor-position dependent signal to regulate said current magnitude so that said instantaneous current values during said angular increment of rotor rotation substantially define a substantially sinusoidal halfwave. The sinusoidal halfwave thus extends in operation of the system over the angular increment of rotor rotation during which the winding is energized. This angular increment is determined by the number of poles and their relative angular extents and in a preferred arrangement is substantially one-half of the angular rotational displacement of the rotor corresponding to one electrical cycle. One electrical cycle of the machine equates to an increment of mechanical rotation determined by the number of poles and phases, and the frequency of the sinewave during operation of the machine is thus established by machine rotational speed in association with these constructional characteristics of the machine. This arrangement in which sinewaves are fed into the machine windings is especially favoured for a four-phase machine, in which the waveshapes for successive phases will be displaced by 90°, i.e. the electrical phase angle.

In a particular embodiment of the current-regulating means, the or each position-dependent signal of the rotor-position sensing means may be a waveshape of appropriate configuration, such as a sinewave, and its instantaneous magnitude at each rotor position is used to establish an appropriate relative value for the winding current. In a further adaptation of this analogue realization of the current-regulating means, the position-dependent signal or signals of the rotor position sensing means may be modified to provide one or more waveshapes of the desired configuration or said waveshapes may be derived from said signal or signals by suitable analogue circuit means.

The drive system according to the invention may also comprise means for producing a signal, the value of which is indicative of a desired parameter of motor operation, said current-regulating means also being responsive to said parameter-indicative signal to regulate said stator winding current so that the absolute magnitude of said current at every angular position of the rotor within said angular increment of rotor rotation during which the winding is connectible to said voltage source or a said voltage source is substantially determined by the value of said parameter-indicative signal. This signal may suitably be a set speed signal, the relevant parameter thus being machine speed, and it may applied to the current-regulating means in the form of a reference voltage, variable between a predetermined positive value and a corresponding negative value to determine both direction and speed of rotation of the machine. The regulating means accordingly establishes in response to the reference signal the appropriate absolute current magnitude required to develop the machine or motor torque necessary to bring the machine speed of rotation to the desired value called for by the level of the reference voltage, while its relative magnitude at each angular rotor position during the period of winding energization is established by the rotor position sensor signal. Thus net machine torque is controlled to achieve a desired speed, while the phase torques during each revolution of the rotor are controlled to give substantially ripple-free phase-to-phase transitions by the relative current magnitude during each period of winding energization being constrained to follow an appropriate waveshape. In an alternative arrangement, the reference signal may be directly indicative of a desired level of torque.

According to a further aspect of the invention directed in particular to generating constructions of systems according to the invention, there is provided a drive system comprising a saturable variable reluctance electrical machine, said electrical machine comprising a stator having a plurality of salient stator poles, a winding for each stator pole, and a rotor having a plurality of salient rotor poles, the number of rotor poles being less than the number of stator poles, the radial airgap between each stator pole and a rotor pole positioned in alignment therewith being small relative to the dimensions of the poles transverse to said airgap and at least the rotor poles being formed so that in operation of the machine magnetic saturation occurs substantially in the region of the mechanically variable interface or overlap between the stator and rotor poles, and the arcuate extents and dispositions of the rotor poles being related to those of the stator poles so that in operation of the machine the torque-producing angular increment of rotor rotation resulting from the mechanical interface or overlap of each rotor pole with a stator pole overlaps the torque-producing angular increment of rotor rotation resulting from the overlap of another rotor pole with a further stator pole, and the system also comprising rotor position-sensing means and a voltage source or sources connectible across the stator pole windings, said windings being connectible across said voltage source(s) in a predetermined sequence during rotor rotation and each stator pole winding being thus connectible for a predetermined angular increment of rotor rotation, and said windings also being connectible across an electrical load during rotor rotation, also in a predetermined sequence, and each stator pole winding being thus connectible for a predetermined further angular increment of rotor rotation.

In operation of a variable reluctance machine as a motor, the windings, which undergo sequential energization to produce rotation in a selected direction, should not be energized to any significant extent during the periods while the rotor poles are moving away from their minimum reluctance positions in alignment with stator poles towards their maximum reluctance positions in relation to these stator poles. In order to operate a machine according to the invention as a generator however, excitation of the windings may be delayed so that torques opposing the direction of rotation are deliberately produced, and conservation of energy then demands that nett currents are returned to the supply. Accordingly in this case voltage is only applied to the windings when substantial overlap of the rotor and stator poles has already taken place, i.e. after the greater part of the potential for producing forward torque is already past. Energization of the windings takes place over a relatively brief angular increment of rotor rotation and terminates as the poles start to move into a relationship tending to produce negative or rotation-opposing torque. The energising voltage should be as high as possible and should only be applied over this relatively brief increment of rotor rotation. Accordingly little current is then drawn from the supply but substantial fluxes are built up, which serve to energize the machine after the winding voltage is shut off near the minimum reluctance position. The energy stored in the flux must be returned during the further rotation of the machine, and thus, as the machine shaft is driven through the torque-opposing angular increment of rotor rotation by a prime mover, current is generated and returned to the supply, which may be fed from the machine through free-wheeling diodes.

Each rotor pole and each stator pole of a machine in accordance with the invention may have circumferentially spaced apart edge regions and said rotor and/or stator pole edge regions may be shaped so that the radial dimension of the airgap and/or its axial extent will vary at least during the commencement of pole overlap. Pole shaping of this kind may be arranged to cause the reluctance of the machine to vary in a predetermined and controlled manner during the initial overlap of a pair of rotor poles with a pair of stator poles and thereby modify the shape of the static torque/rotor angle characteristic so as to reduce in particular the rapid rate of rise of torque normally experienced at the commencement of pole overlap. The less drastic rates of change of phase torque thus achieved enable the torque-generating portion of each phase to be extended into the initial and terminal pole overlap regions of the static torque characteristic while still achieving relatively smooth torque transitions between phases, in that such transitions may be achieved with less drastic rates of change in the winding currents in the initial and terminal regions of the energizing waveshapes than would be required were the static torque/angle characteristics unmodified. The establishment of an appropriate magnitude for the winding current at each successive rotor position during the angular increment for which the winding is energized is also facilitated, in that the changes in current required between successive rotor positions follow a more regular pattern compared with those needed for unshaped poles, and it is thus easier for the current-regulating means to provide the required current waveshapes, especially at high rotational speeds.

The surface portions of the poleface of each rotor pole and/or each stator pole in said edge regions may be radially displaced relative to the central surface portion of the poleface so that the the airgap between an edge region surface portion of the poleface and the poleface of an aligned pole is greater than the airgap between the central surface portion of the poleface and the poleface of an aligned pole. Accordingly in this arrangement, the pole shaping is achieved by curving the axially extending edge surfaces of the polefaces radially away from the airgap region to define a larger airgap in these edge surface regions than prevails over the major extent of the poleface surface.

Each said edge region may be defined in the axial direction of the pole by a succession of edge region portions, each said edge region portion being circumferentially displaced relative to the or each adjacent edge region portion of said edge region, and the circumferential displacement of each said edge region portion being in the same circumferential direction relative to the preceding edge region portion so that said edge region is skewed relative to the axis of rotation of the rotor. In this case therefore, pole shaping is achieved by skewing the pole so that its edges have a twist about the axis of the rotor along their axial extent.

The circumferential spacing of said edge regions of each pole may be substantially constant throughout the axial extent of the pole and the circumferential displacement of an edge region portion of one of said edge regions at one axial end of the pole relative to a said portion of the same edge region at the other axial end of the pole is between one quarter of the constant circumferential spacing of the edge regions of the pole and a value equal to said spacing. This particular construction of skewed pole is found to be advantageous in variable reluctance machines in general, apart from its particular advantages in the drive system according to the first aspect of the present invention. Thus both in systems in accordance with said first aspect and also in machines in accordance with the second aspect of the invention, said circumferential displacement between said edge region portions at the axial ends of the pole may be approximately one-half of said arcuate extent and may subtend an angle at the rotor axis of not less than 5°. A preferred value of said subtended angle is 10°.

In a reluctance machine in accordance with this construction of the invention, the magnetic permeance of each phase varies with rotor position in a controlled manner and abrupt changes of permeance with rotor position are avoided. The magnetic permeance may vary with rotor position in a substantially symmetrical manner, e.g. sinusoidally. Such characteristics may be achieved either by skewing the rotor poles or the stator poles or both, or by shaping the poles, e.g. at their tips, so that there a controlled variation in airgap with rotor position. A symmetrical static torque versus rotor angle characteristic is especially advantageous for reversibly operating machines such as motors and is particularly beneficial when used with control systems by virtue of which the phase windings are fed with currents appropriately tailored or selected to give substantially smooth transfer of torque between the phases.

The rotor in all constructions of the invention is most suitably built up from a stack of laminations having substantially identical peripheries, each lamination being slightly skewed relative to its neighbour or neighbours. Pole shaping by skewing is constructionally simple and economical and is thus preferably to the more complex pole structures of the prior art, such as those embodying fanned teeth or undercut recesses. Surprisingly it has been found by both theoretical studies and by experimentation that the extent of the pole skewing is significant in modifying in particular the rate at which torque rises at the start of the static torque against rotor angle characteristic and that moderate skewing (for example, where the circumferential displacement between said edge region portions at the axial ends of the rotor is approximately one quarter of the pole span between its tips, i.e. depending on the number of poles, it typically subtends an angle at the rotor axis of 5° or less) is relatively ineffective in modifying this initial torque rise. In a preferred embodiment, the circumferential displacement between said axially outermost edge region portions is approximately one-half of the constant arcuate extent of the pole. Where this displacement varies between one quarter of the pole span between its tips and one-half of said span, the angle subtended at the rotor axis is then typically not less than 5° and a particularly favourable value of the subtended angle is approximately 10° in a typical construction of rotor, for example, with eight stator poles and six rotor poles.

Suitably skewed poles may permit a substantially symmetrical static torque/rotor angle characteristic to be achieved. Such a characteristic is of particular advantage in a construction of the drive system according to the invention in which the machine is required to be reversible, in that the current shaping required to bring about smooth transitions between the phase torques in operation is then substantially the same for each direction of rotation. Hence the stator windings may be energized with symmetrical current waveforms usable in both directions of rotation.

In particular, in a system according to the invention incorporating a four-phase machine according to the second aspect of the invention, in which the poles are suitably shaped, substantially sinusoidal static torque/rotor angle characteristics may be achieved, and energization of the stator windings with sinusoidal halfwaves, each of which extends over an angular increment of rotor rotation corresponding to that portion of the static torque/angle characteristic which will produce a phase torque in operation of the machine in the required direction of rotation, results in the phase torques in operation of the machine having substantially the form of sine squared waves, since the magnitudes of the phase torques developed when the machine is energized are substantially linearly proportional to the exciting currents, at least in the normal operating range of such a machine, and the static torque for each phase at each level of energizing currents itself follows a sinewave. In the four-phase machine, each succeeding phase is electrically displaced by 90°, and its energizing half-sinewave may therefore be described by a cosine wave. The phase torques are similarly displaced in operation of the machine and the phase torque sequentially succeeding a sine squared phase torque wave has therefore the form of a cosine squared wave. Accordingly in the torque transitions, the outgoing sine squared torque and the incoming cosine squared torque ideally sum to a substantially constant value, giving an exceptionally smooth transfer of torque between the phases.

In drive systems according to the invention, sinusoidal-form currents are found to give particularly favourable operating results from the point of view of torque smoothness and reduced noise and vibration. The controlled transfer of torque from phase to phase is especially effective in reducing the excitation of vibration modes and resonances in the physical structure of the reluctance machine due to the elimination of abruptly rising torque characteristics. When sinusoidal halfwave currents are associated with substantially sinusoidal static torque versus rotor angle characteristics, such as are achieved by the skewed rotor construction referred to previously, these sinusoidal-form currents also represent a substantial optimum so far as minimization of losses in the windings is concerned, in that the windings are substantially not energized except when useful torque can be developed. The absence of rotor windings in the machine of the invention results in the desired high ratio of torque to inertia while economical construction may be achieved in that the machine and system of the invention do not require the poles of the machine to be provided with permanent magnets.

In a generator configuration of the machine of the invention, the winding of each pole may be associated with that of at least one other pole to define a phase of the machine and said associated windings may be connectible in parallel across a voltage source or voltage sources. In an alternative generator configuration of the machine of the invention, a field winding is provided, which sets up a constant flux divided between the phases of the machine in relation to their relative reluctances. These relative reluctances change as the rotor rotates and accordingly the phase winding flux linkages also change, giving phase voltages.

The variable reluctance machines forming the subject of the present invention are suitable for operation in applications requiring the highest levels of performance, such as, for example, servomotors in machine tools and robots. However their simplicity of construction, in terms of moving parts and numbers of components, also renders them suitable for a wide range of general industrial applications also, including for example, drives for pumps, compressors and hoists etc.

The relative mechanical simplicity of the machines also gives them an inherent reliability, so that they are also suited to applications in which trouble-free operation is vital. Such applications include transfer lines, nuclear reactors, continuous industrial processes and space vehicles or satellites.

BRIEF DESCRIPTION OF THE DRAWINGS

The principles of operation of variable reluctance machines and stepping motors are now described having regard to FIGS. 1 to 11 and 14 of the accompanying drawings and embodiments of the present invention are then described having regard to FIGS. 12 and 13 and 15 to 26.

FIG. 14B is an enlarged developed side view of some of the rotor and stator poles of FIG. 19A, showing the dimensional relationships between them.

DETAILED DESCRIPTION OF THE DRAWINGS

Figure 1:
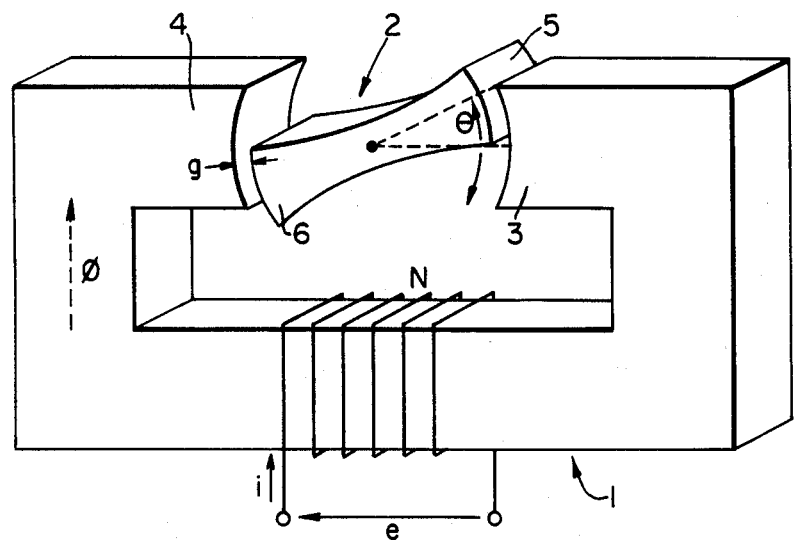
FIG. 1 is a schematic pictorial view of a simple reluctance motor having two poles on both the rotor and the stator.

As shown in FIG. 1, a simple reluctance motor having a stator 1 and a rotor 2 has two stator poles 3 and 4 and two rotor poles 5 and 6. The motor is excited by the application of an energizing current i to a field winding N, the driving voltage being e. A flux $\phi$ is thereby produced and a torque is exerted on the rotor so as to minimize the reluctance of the system. In the motor shown, this corresponds to maximizing the overlap in the airgap region g, so that the rotor will turn from the position illustrated through the angle of rotation $\theta$ until its poles 5 and 6 are exactly aligned with the stator poles 3 and 4. The rotor is now stable in this position and cannot be moved further until the winding N is de-energized. In the simple motor illustrated, continuous rotation is not therefore possible and further phases must be added in order to provide a machine capable of continuous operation.

Figure 2:
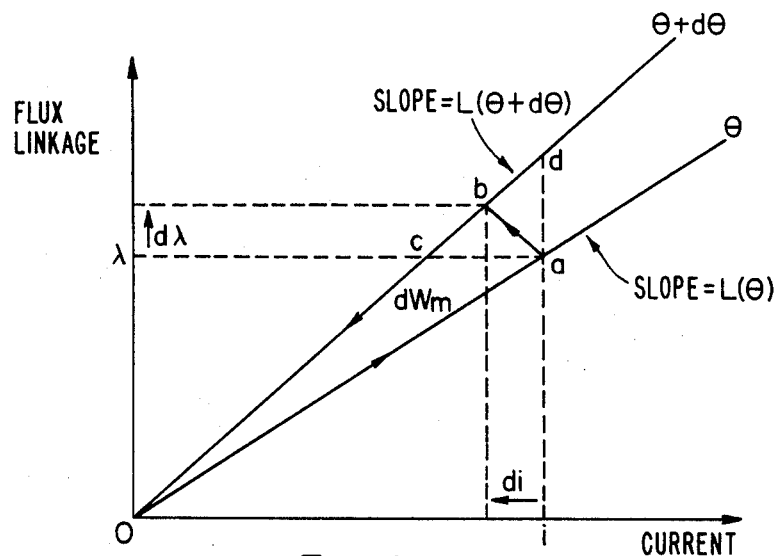
FIG. 2 is a diagram showing a trajectory in the flux-current plane for a linear magnetic system in the simple motor of FIG. 1.

The conversion of energy from the electrical input to work or a mechanical output is illustrated in FIG. 2 for a linear magnetic system in which the reluctance of the airgap dominates total reluctance of the system. In this case the flux linkage is directly proportional to the exciting current at all levels of current and the work done during a displacement of the rotor through an angle d$\theta$ is represented by the area of the triangle 0ab0. It can be shown from theoretical considerations that the torque output of the rotor is proportional to the square of the exciting current and that the idealized mechanical work output of the system at constant current (ignoring losses) corresponds to only one-half of the electrical energy input. The remainder of the input energy is absorbed as stored energy in the system during the displacement.

Figure 3:
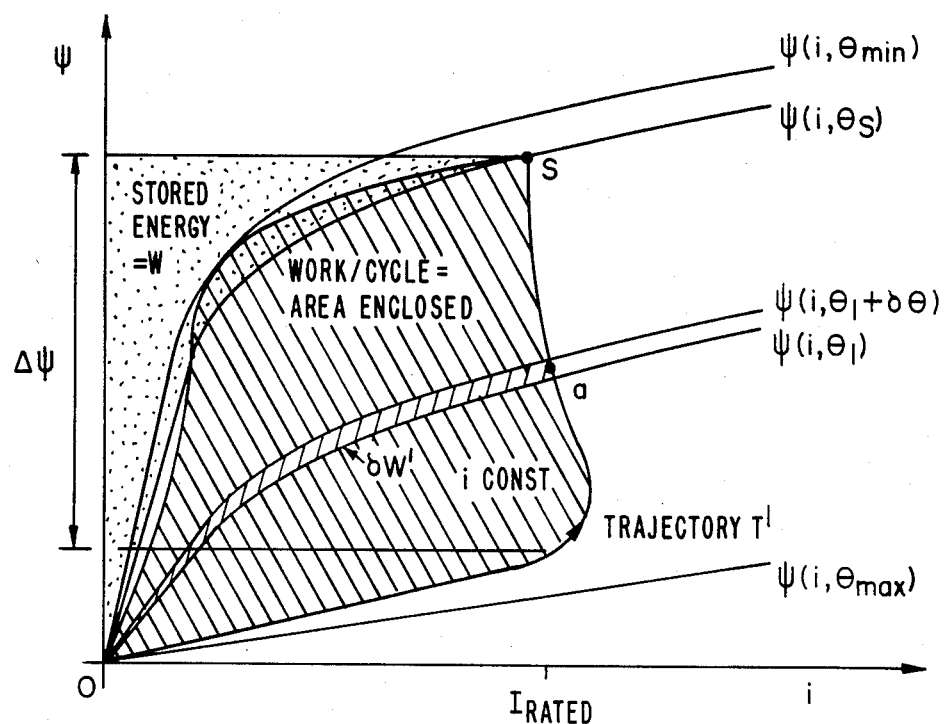
FIG. 3 is a diagram showing a trajectory in the flux-current plane for a saturated magnetic system in a variable reluctance motor.

In a practical magnetic system, saturation of magnetic material means that the relationship between flux linkage and current varies with the exciting current and a maximum substantially constant level of flux linkage prevails once a certain level of exciting current has been reached. As in the case of the linear system, the relationship between flux linkage and exciting current varies for different rotor orientations and FIG. 3 shows a typical family of flux linkage versus exciting current curves for (1) an angle corresponding to the position of minimum reluctance of the rotor ($\theta$min), (2) a maximum reluctance rotor position ($\theta$max) and (3) a rotor angle ($\theta$s) corresponding to the position of the rotor when the winding current is suppressed. The trajectory 0aS0 thus traversed corresponds to excitation of the winding with a constant positive voltage between a rotor position shortly after its position of maximum reluctance and the rotor angular position ($\theta$s) at switch-off, and excitation with an equal negative voltage from the switch-off angle to the position of minimum reluctance. The output of mechanical energy during this displacement of the rotor between its positions of maximum and minimum reluctance is represented by the area enclosed within the trajectory and it can be shown that in this case the torque produced is now directly proportional to the exciting current for incremental current changes in the saturated region only, i.e. it is a linear function of that current rather than being proportional to its square, while the torque is also considerably increased (ignoring losses) compared with the linear magnetic system. However, it should be noted that this linear relationship does not hold true below the knee of the flux linkage vs. current curve. While losses reduce the overall gain in torque output, a substantial net improvement still prevails over the linear magnetic system. The stored energy in the saturated case is substantially reduced in relation to the energy converted to mechanical work, as can be seen from FIG. 3. It will however also be apparent from FIG. 3 that the behaviour of a reluctance machine in a saturated mode is highly non-linear and is not susceptible to simple analysis.

Figure 4:
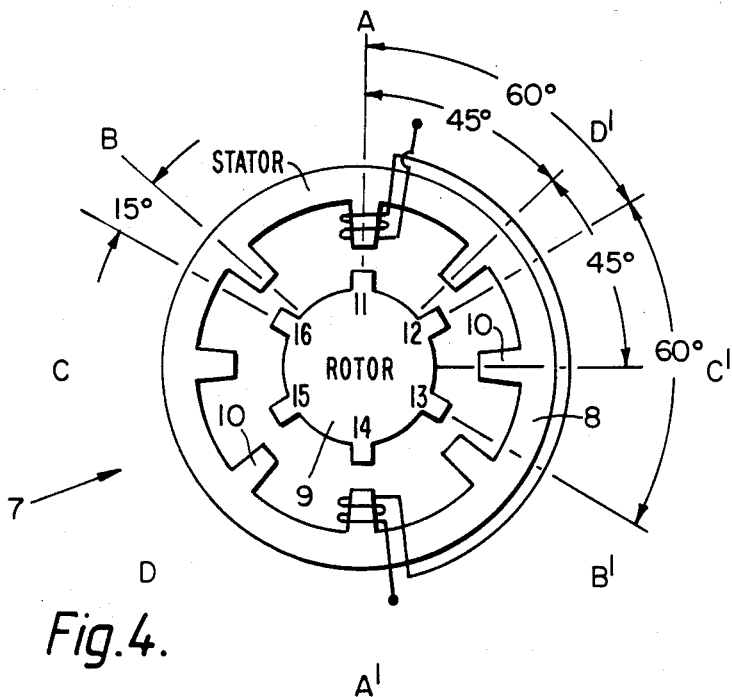
FIG. 4 is a schematic end view of a four-phase variable reluctance motor having eight stator poles and six motor poles.

In the practical construction of variable reluctance motor shown schematically in FIG. 4, the doubly salient motor 7 has a stator 8 and a rotor 9. Saturation is achieved by a suitably small value of airgap and by the series-connected windings having sufficient ampere-turns to establish saturated conditions in the region of the airgap. Thus saturation in the region of pole overlap is brought about not only by selecting a suitable structure and suitable dimensions for the poles but also by keeping the radial airgap between overlapping aligned poles to a minimum. The stator has eight inwardly projecting poles 10 and the rotor has six outwardly directed poles numbered 11 to 16 in FIG. 4. The motor has 4 phases, A,B,C,D, each consisting of a pair of windings, e.g. A, A', on diametrically opposed stator poles. Only one pair of rotor poles can be aligned with a pair of stator poles at any one time. The stator pole spacing is 45° while the rotor pole spacing is 60°, and the difference between these two values, i.e. 15°, defines the step angle of the machine, i.e. the angular distance through which the rotor will travel between the minimum reluctance position when a particular phase is energized and the minimum reluctance position for the adjacent phase. When phase A is energized, the rotor rotates so that poles 11 and 14 move into alignment with the stator poles of phase A. Further rotation through the next 15° incremental step is then brought about by energizing either phase B, for clockwise rotation, or phase D, for counter-clockwise rotation. This construction of reluctance motor is both self-starting and reversible but the direction of rotation is not dependent on the direction of current flow through the phase windings and is brought about exclusively by appropriate sequential unipolar energization of the phase windings.

Figure 5:
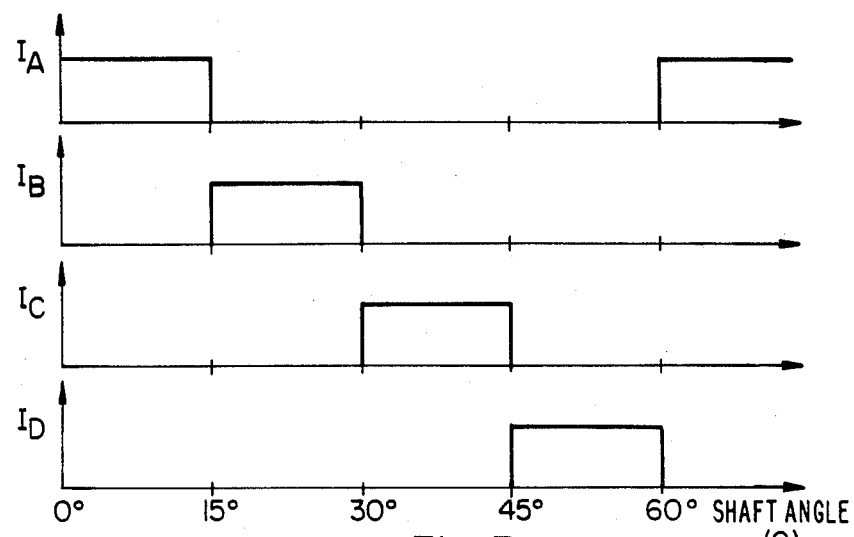
FIG. 5 is a diagram showing idealized phase current waveforms for clockwise rotation of the motor of FIG. 4 over one electrical cycle.

One electrical cycle of the machine corresponds to that increment of mechanical rotation of the rotor required for each phase to be energized once and thus advance the rotor through a respective step angle before the sequence of phase excitation recommences. In the four-phase motor the electrical cycle is equivalent to 60° mechanical, while in a six stator pole, four rotor pole three-phase machine, the step angle will be 30° and the electrical cycle will extend over 90°. The duration of stator pole winding energization necessary to achieve stepping advance of the rotor must at least equate to the step angle. FIG. 5 shows idealized phase current waveforms over one electrical cycle for the motor of FIG. 4, this corresponding to 60° of rotor mechanical rotation. The type of waveform illustrated is referred to as a step current waveform. Each phase is energized in sequence with a constant level of current throughout the interval corresponding to one step angle. This type of excitation is suitable for applications where incremental motion is required but results in a pulsating torque, an effect which is augmented at low speeds, resulting in a stepping or cogging motion. The abruptness of this stepping transition of torque from phase to phase may be partly alleviated by arranging the torque producing region of each outgoing phase to overlap with that of the incoming phase. Torque overlap between adjacent phases of a variable reluctance machine (VRM) may be achieved by suitable design of the machine with an appropriate inter-relationship between the arcuate extends of the rotor and stator poles respectively and the period of excitation is then extended to give the required torque overlap. Depending on the relative angular extents of the rotor and stator and the resultant duration of physical rotor and stator pole overlap during each electrical cycle of the rotation of the rotor, the period of winding energization may be prolonged up to an angular increment of rotor rotation corresponding to substantially one-half of the electrical cycle, i.e. 30° in the four phase machine already mentioned. In this latter event, each torque generating portion of a phase will overlap with that of a preceding outgoing phase for the first half of an electrical cycle and with the torque-generating portion of an incoming phase for the second half of the cycle, so that there will be substantially continuous torque overlap throughout each revolution of the rotor, with two phases always being active at any one time. However while simultaneous excitation of two phases is essential during overlap, it is not necessary for such simultaneous energization to take place at all times, although it may do so where the period of excitation is prolonged as already noted. In many constructions, two phases may be energized only during torque overlap, and at other times, only one phase is energized.

Figure 6:
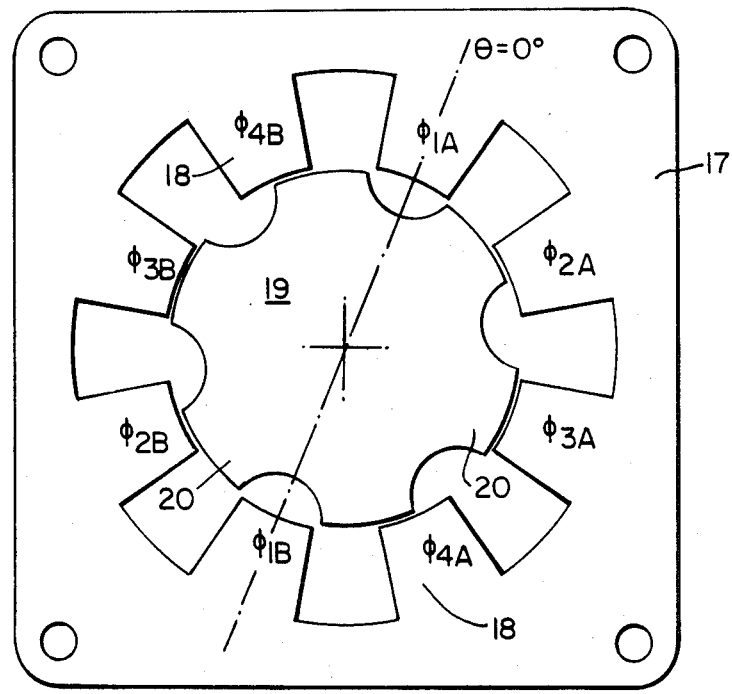
FIG. 6 is an outline end view of stator and rotor laminations for a practical construction of variable reluctance motor having eight stator poles and six rotor poles, showing the rotor in the position of maximum reluctance for phase 1.

A practical construction of rotor and stator laminations for achieving such torque overlap is shown in FIG. 6. The four-phase machine illustrated is again doubly salient, the stator lamination 17 having inwardly projecting stator poles 18 and the rotor lamination 19 having complementary outwardly projecting rotor poles 20. The stator poles carry phase windings for unipolar sequential energization to develop reluctance torque by the tendency of each rotor pole pair to move into alignment with an excited stator phase. Rotor lamination 19 is shown in the maximum reluctance position for phase 1 with adjacent rotor poles 20 positioned so that the gap between them is symmetrically located relative to the diametral axis of the machine through the stator poles 18 of phase 1. This maximum reluctance position for this phase may be used to give a rotor angle datum for controlling motor rotation and pictorialising motor behaviour by means of torque versus rotor angle and current versus rotor angle curves.

Figure 7:
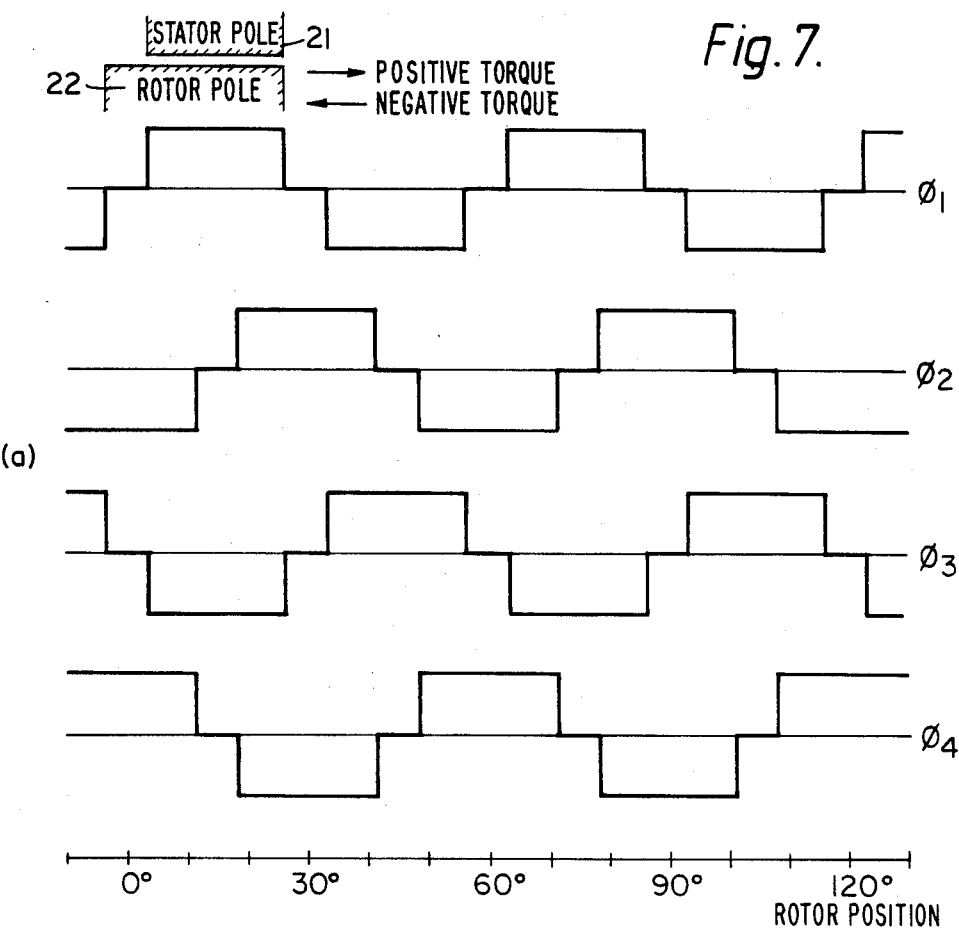
FIG. 7 is a diagram showing idealized static torques against rotor angle at constant current for each phase in an idealized motor in accordance with the construction of FIG. 6, with torque overlap between phases.

FIG. 7 shows static torque versus rotor position curves at constant current derived by energizing each phase of a machine in accordance with FIG. 6 with a direct current and displacing the rotor through an appropriate angular distance, the torque value at each of a selected series of incremental rotor angles during this displacement being recorded. For each phase, positive and negative static torque curves will be plotted during this d.c. excitation, but by virtue of the sequential energization of the stator phase windings for appropriate angular increments of rotor rotation in operation of the motor, only positive or negative torques respectively are developed in each phase during such operation depending on the selected direction of rotation of the rotor. FIG. 7 represents idealized static phase torques for a machine having laminations such as those of FIG. 6 and the relative dimensions of the stator pole 21 to the rotor pole 22 are as indicated schematically at the top of FIG. 7, the arcuate extent of the rotor pole therefore somewhat exceeding that of the stator pole in relative terms, while the absolute arcuate extents of the poles are such that torque is developed in each phase before the production of torque by the preceding phase ceases. It can be shown from theory, assuming no fringing flux, that the tangential force between overlapping poles or attached slabs commences with the start of pole overlap, which for the idealized curves of FIG. 7 begins a short angular distance after the maximum reluctance datum position of FIG. 6. Torque continues to be generated as overlap between the poles proceeds but the level of the torque is, in the ideal case, independent of the degree of overlap between the poles. The development of torque ceases when full overlap is achieved between the rotor and stator poles. The effect of the greater arcuate extent of the rotor pole relative to that of the stator pole and the non-development of torque during relative pole movement while there is complete overlap between the rotor and stator poles may be seen in FIG. 7 in the angularly short zero torque region or deadband between the positive and negative portions of the static torque curve for each phase.

Figure 8:
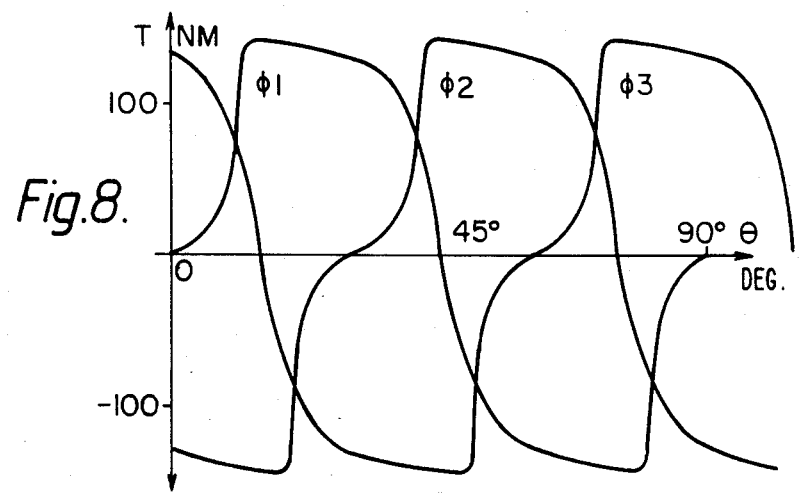
FIG. 8 is a diagram showing curves for static torque against rotor angle at constant current with torque overlap between phases for a three-phase variable reluctance motor having six stator poles and four rotor poles.

The phase torques of a practical motor in fact depart substantially from the ideal curves of FIG. 7. Examples of the phase torques to be expected in practice are shown in FIG. 8 for the three phases of a three-phase six stator pole four rotor pole machine, which is a further example of a self-starting and reversible configuration of VRM. At least part of the divergence of the curves of FIG. 8 from the idealized characteristics of FIG. 7 may be accounted for by fringing fluxes and non-linearities. Considering the characteristic for phase 1 shown in FIG. 8 initially around the maximum reluctance position (0°), the rotor poles and the stator poles for phase 1 are, in the particular construction for which the curves are plotted, a long way from overlapping. At about 10°, the rotor and stator poles come into close proximity and a region of rapidly rising torque commences. By approximately 12°, actul overlap of the poles has commenced and the torque has risen to a value which remains largely constant for further advance in angle, with some roll-off due to bulk saturation effects in the flux paths. From approximately 37°, full overlap of the poles is approached and torque then rolls off very rapidly with further increase in angle, due to extensive and undesirable bulk saturation in the flux paths. In this particular construction, the torque at the points of intersection between succesive phases is approximately 54% of peak torque, so that switching between phases at these points still results in considerable torque ripple. An additional serious problem however in this construction, especially at low speeds, is the exceedingly rapid rise of torque at the commencement of pole overlap. Torque builds up to more or less its full value in the space of approximately 2° of rotor mechanical rotation, so that its effect is similar to that of an impulsive blow to the poles of the machine, setting up noise and vibration.

Figure 9:
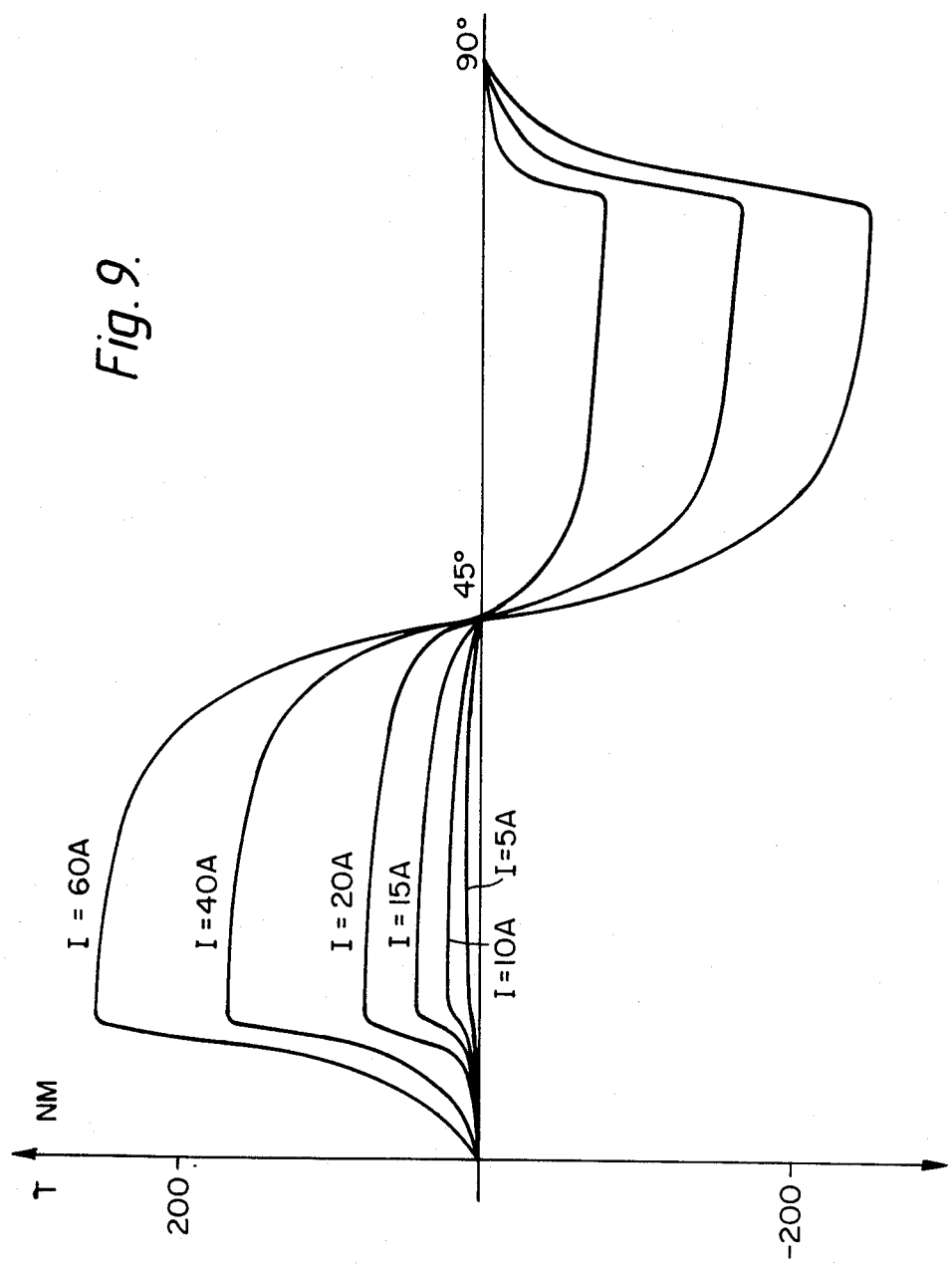
FIG. 9 is a diagram showing static torque against rotor angle for one phase of a three-phase variable reluctance machine at varying levels of stator current.

FIG. 9 shows a family of static torque versus rotor angle curves for phase 1 of FIG. 8 for different values of phase current. The period during which the torque is substantially constant is relatively greater for low values of exciting current, and the roll-off at the end of the characteristic is relatively less significant. However the rapid initial rise in torque can be seen to be a problem at all current levels and is not alleviated by a reduction in excitation current.

Figure 10:
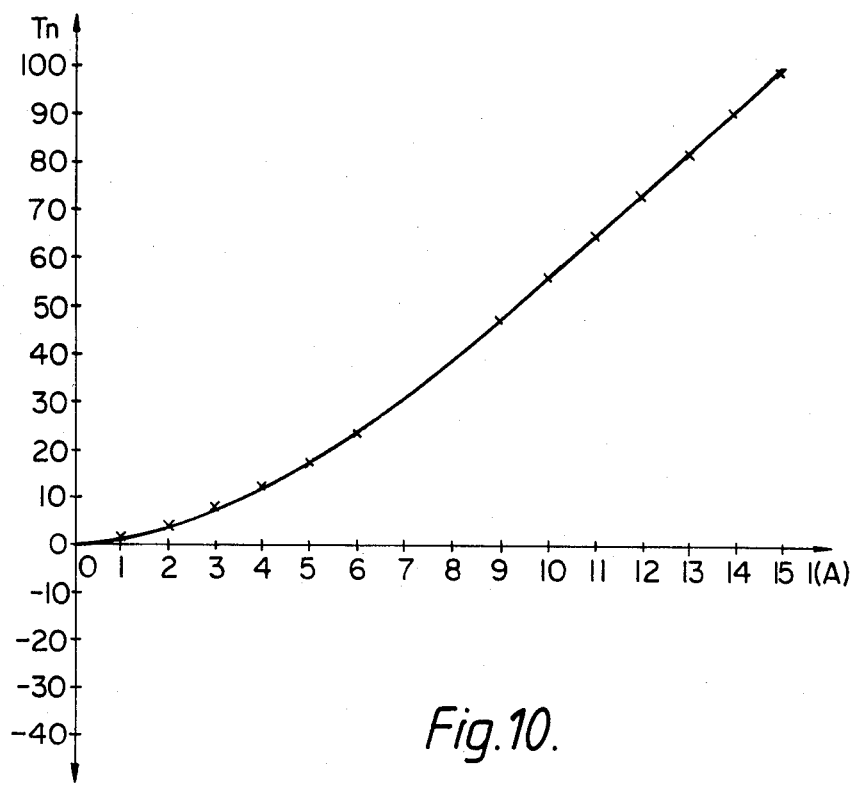
FIG. 10 is a diagram showing static torque against current for one phase of a four-phase machine with the rotor in the minimum reluctance position.

In addition to the torque versus rotor angle curves of FIGS. 8 and 9, curves for torque versus phase current may be plotted for each phase for each rotor angle. An example of a torque versus current characteristic for one phase of a four-phase machine with the rotor in a minimum reluctance position is shown in FIG. 10. As previously explained in relation to the trajectory of FIG. 3, for a saturated magnetic system the relationship between torque and exciting current is in theory linear. In practice, at low currents before saturation is established, the torque initially increases in proportion to the square of the current, and only when magnetic saturation is established, does the torque then continue to increase in linear relationship with the current. This change from magnetically linear conditions to magnetically saturated conditions is represented by a gradual transition zone corresponding to the roll-off in the curve relating flux linkage to current for the saturated case, as exemplified by the curve for the minimum reluctance position of the rotor in FIG. 3. Above the knee of the B—H curve, torque is substantially linearly related to current. For the curve of FIG. 10, the relationship is generally linear above about 7A. The initial non-linearity of the relationship between torque and current at relatively low current values is also reflected in curves such as those of FIG. 9, where the incremental increase in torque for a specified increase in current will differ for successive similar incremental increases in current. In the system to which FIG. 9 relates, the incremental increase in torque for an increase in current from 5 to 10A will be seen to be different from that for an increase from 10A to 15A, the increase in torque for the 5A current increase from 10A to 15A being substantially greater than that for the change in current from 5A to 10A. However it will also be seen that for increases in current once the current exceeds about 20A, successive incremental increases in current will achieve substantially the same incremental change in torque over quite a wide range of current regardless of the actual current values delimiting the change. At very high levels of current, in excess of the maximum 60A value shown in FIG. 9, non-linearity again comes into play with the onset of bulk saturation, which is undesirable. Bulk saturation is also reflected in curves such as that of FIG. 10 by a roll-off in the relationship between torque and current at very high levels of current. For ease of control therefore, a variable reluctance motor is preferably rated to operate in the region in which torque is substantially linearly related to current, and while the effects of torque linearity at low currents and torque roll-off at high currents are then of little practical significance for stepping motor exemplifications of variable reluctance machines, it further complicates application of the VRM to variable speed drives, in which, in particular, low current operation in the non-linear region of curves such as that of FIG. 10 may be unavoidable at low shaft speeds and under standstill conditions.

Figure 11:
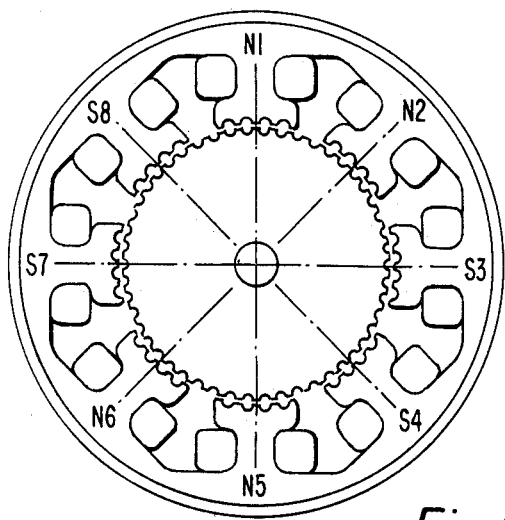
FIG. 11 is a cross-section through the rotor and stator of a two-hundred step per revolution permanent magnet stepping motor.

An example of a 200 step permanent magnetic stepping motor using bipolar exciting currents is shown in FIG. 11, in which it will be seen that the teeth on the rotor and stator are constituted by respective substantially semi-circular cutouts in the external and internal peripheries of the rotor and stator respectively. It can be seen that the dimensions of the teeth are accordingly relative small in relation to other dimensions of the rotor and stator and in particular, the airgap is then relatively large compared with the dimensions of the teeth, which, it is believed, results in the smoothed static torque versus angle characteristics of such motors, previously referred to in this specification.

Figure 12:
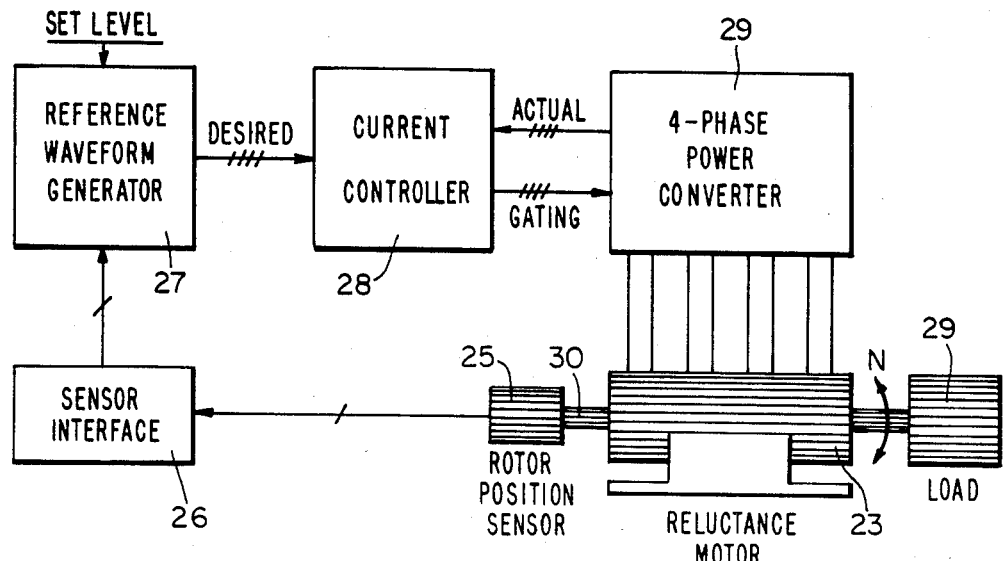
FIG. 12 is a block diagram of a variable reluctance motor drive system embodying the principles of the present invention.

A variable reluctance motor drive system under torque control and embodying the principles of the present invention is shown in FIG. 12. As depicted in this Figure, the system has only an inner torque control loop, which is relevant to the present discussion, but in a typical practical construction, an outer speed control loop is also provided, the torque then being adjusted or controlled to meet a set speed signal in operation of the system. As shown therefore a four-phase reluctance motor 23 drives a load 24 and has a rotor position sensor 25 associated with its shaft 30. The sensor may be, for example, an encoder generating one or more streams of pulses which are electronically processed to provide shaft position information at a succession of angular intervals. Appropriate logic is employed to permit determination of the direction rotation, and a zero marker is also provided. A reference waveform generator 27 uses position information from the sensor 25, modified as required by sensor interface 26, to provide as an output, a signal indicative of the value of current required in each phase for each angular position of the shaft to achieve a desired shape of phase torque. The generator 27 has a further "set level" input adjustable by a controller or monitoring means, for determining the actual value of the torque to be generated, subject to the shape constraints also called for by the generator. The output signal from the generator 27, of a value determined by the combination of rotor position signal and set level input, is applied to a current controller 28, which provides an output signal for each of the four phases of the motor in the form of a reference current waveshape. These reference waveshapes then provide gating signals or inputs to a power converter 29 in which the actual phase currents of the motor are forced to track the reference current waveforms. For this purpose a signal indicative of the actual current in each phase is fed back to the current controller, so that the gating signal forwarded to the converter from the controller 28 serves to produce the required phase current. The waveform generator 27 and the current controller 28 together form current magnitude regulating means by which the relative instantaneous value of the exciting current in each stator winding at every rotor position can be controlled so that the energizing current will have a waveshape suitable for achieving the phase torques desired during operation of the motor for smooth torque transitions between phases and minimization of "hammer-blow". According to various constructions of the system of the invention, specific waveshapes may be produced by appropriate analogue means. In one such embodiment, the output of the sensor may be modified to provide a sinewave, the instantaneous magnitude of which at each rotor position is used directly to establish the appropriate relative value for the winding current. The current regulating means formed by generator 27 and controller 28 is further responsive to the "set level" signal to establish an absolute magnitude for the current at each rotor position, while the relative value of the current at that position compared with its value at any and every other position is determined by the rotor position as signalled by the sensor 25. A digital control strategy is described in our co-pending patent application Ser. No. 788,856 entitled "Control Systems for Variable Reluctance Motors".

Figure 13:
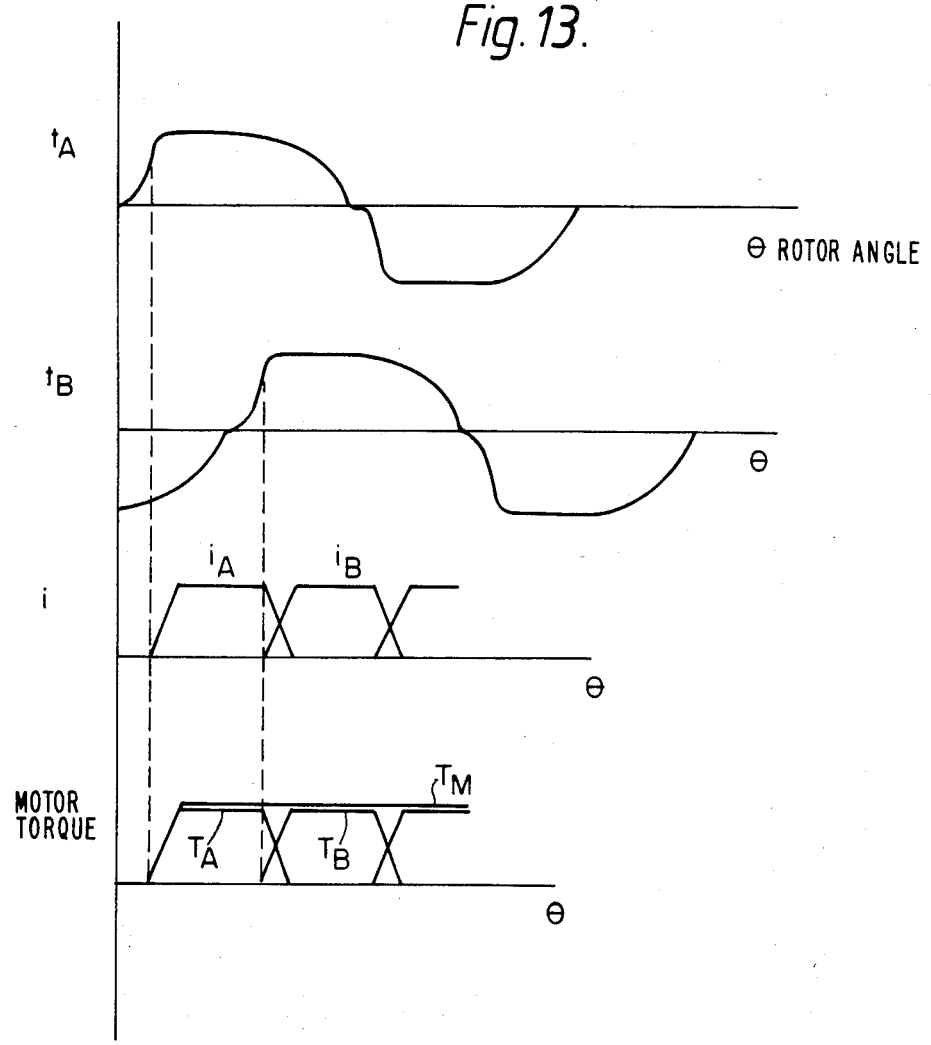
FIG. 13 is a diagram showing static torques against rotor angle for two phases of a four-phase VRM (variable reluctance motor) using ramped or trapezoidal current waveforms for producing smooth transitions between individual phase torques, together with the resulting motor phase torques in operation.

A particular strategy using ramped current magnitudes to overcome the problem of the initial rapid torque rise at the commencement of overlap and the torque ripple arising from switching between the roll-off portion of a phase coming to an end and the rising torque portion of a phase beginning pole overlap is illustrated in FIG. 13. The drawing is schematic only and is not intended to represent any particular machine characteristic. Static phase torques (t) are shown against rotor angle for phases A and B, together with current waveforms (i) to be applied to these phases to yield a relatively smooth motor torque. The strategy involves switching current into a phase (as shown for phase A) at a controlled rate rising linearly but commencing only after the initial sharp static torque rise so that the torque (T) produced by this phase in operation of the motor rises at a controlled rate corresponding to the rate of current rise to a steady level of torque corresponding to the substantially constant torque portion of the static torque curve which prevails during the progression of pole overlap following the initial rise in the static torque curve at the commencement of pole overlap. Current in phase A is then similarly ramped down towards the end of its constant torque region, commencing at the point where current for phase B begins its controlled rise. Thus the current magnitude remains substantially constant during an intermediate portion of the angular increment of rotor rotation during which each winding is energized. The initial and terminal portions of the increment of energization have, respectively, rising current magnitudes and falling current magnitudes, and, as shown in the Figure, the rate of increase of current during the initial portion of the angular increment of rotor rotation is the same as the rate of decline of current during the terminal portion. Appropriate selection of the intersections between these current curves will yield substantially ripple-free overall motor torque without the impulsive forces caused by the sharply rising initial parts of the static torque characteristics. The phase torques in operation of the motor then consist of a succession of those portions of the individual static torque characteristics resulting from energization of the individual phase windings at appropriate stages. The net motor torque during each transition between phases is computed by adding the individual phase torques during the transition. The waveforms required for the strategy of FIG. 13 may be derived by computation or experiment and constructed in operation by a system in accordance with FIG. 12, for example by an appropriate analogue construction of the generator 27.

However such ramped currents are not necessarily easily synthesized in an economical construction by current-regulating means, such as an analogue embodiment of the generator, especially at high rotational speeds, and in addition, phase to phase torque transitions may not necessariily be smoothed for each successive transition by similar ramps, in that the precise shapes of the statics torques in the transition regions are to an extent affected by the polarities of the poles between which the transitions take place and are not necessarily identical for each such transition. Accordingly individual analogue ramp generators may require to be specifically tailored for each phase to phase transition. In addition, it will be evident from FIG. 13 that since a proportion of the potential torque-generating capacity of each phase is not fully utilized or is not utilized at all, there is an effective derating of the machine, which while not unacceptable in many applications, is preferably avoided. In an alternative strategy, therefore, the shape of the static torque against rotor angle characteristic is modified to ease the rate of torque rise at the beginning of pole overlap, thus allowing phase currents to be switched during the initial commencement of pole overlap but without the current regulating means having to take account of the abrupt changes in torque experienced at this stage of overlap with characteristics such as those shown in FIG. 13.

Figure 14:
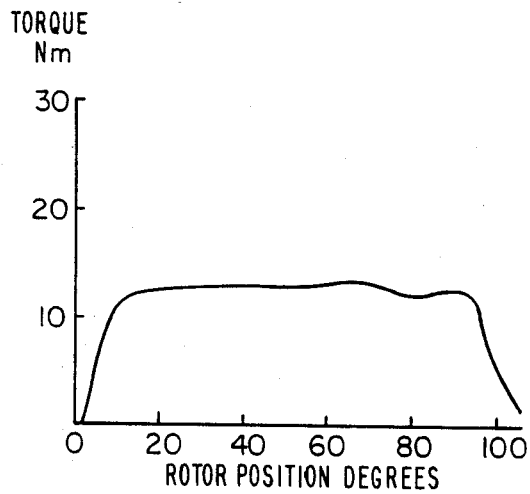
FIG. 14 shows the static torque versus rotor angle characteristic achieved by a particular pole arrangement in a known construction of reluctance motor.

Modification of the shape of the static torque curve may be achieved by shaping either rotor or stator poles or both. In one known construction, the modified static torque versus rotor angle characteristic shown in FIG. 14 was achieved. This substantially trapezoidal characteristic has a smoothly rising ramp in substitution for the rapidly rising initial portion of the curves of FIG. 13 and a similarly falling ramp, albeit at a slightly different rate from the rising ramp, takes the place of the roll-off portion of the curves of FIG. 13.

Figure 15B:
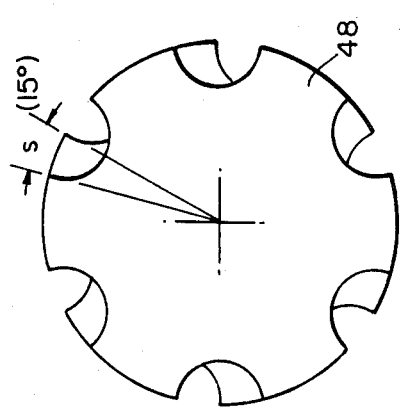
FIG. 15B shows in side view, the skewed pole rotor construction of FIG. 15A.
Figure 15A:
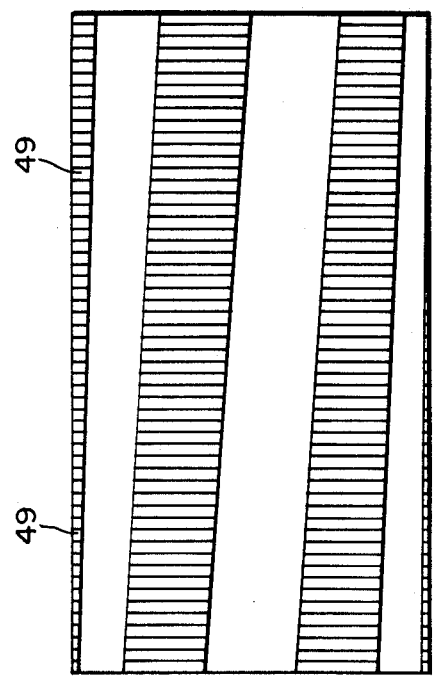
FIG. 15A shows in and end view, a rotor construction having skewed poles.

A construction of rotor according to the present invention for achieving a suitably modified static torque against rotor angle characteristic is shown in FIGS. 15A and 15B. The rotor 48 consists of a large number of laminations 49, each of which is identical with its neighbours but is slightly displaced rotationally about the axis of the rotor, so that for laminations intermediate the ends of the rotor, the leading faces of the pole portions defined by each lamination are slightly in advance of those of the lamination to one axial side of it and slightly to the rear of the front pole edge defining faces of the lamination to its other axial side, this relative advance being in a circumferential direction about the axis of the rotor. Thus in this arrangement, the poles of the laminated rotor are skewed along the axial length of the rotor relative to its axis of rotation. In order to achieve this, each rotor lamination is slightly displaced relative to its axial neighbours in the laminated rotor assembly. The circumferential direction of this displacement is consistent throughout the length of the rotor, so that each lamination is either advanced or set back relative to its predecessor. Accordingly each rotor pole is skewed from one axial end of the rotor to the other, and the angle of skew as shown in FIG. 15 is 15° about the axis of the rotor. This angle of skew is defined about the rotor axis between a rotor radius passing through the leading edge of the lamination at one pole at one end of the stack and that passing through the leading edge of the lamination at the other end of the stack at the same pole.

Figure 16B:
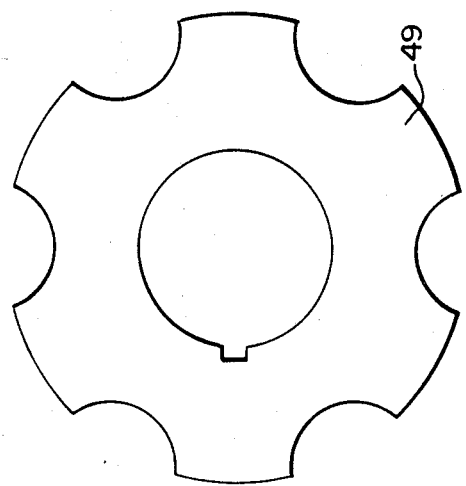
FIG. 16B shows in end view a practical construction of rotor lamination for the rotor of FIGS. 15A and 15B.
Figure 16A:
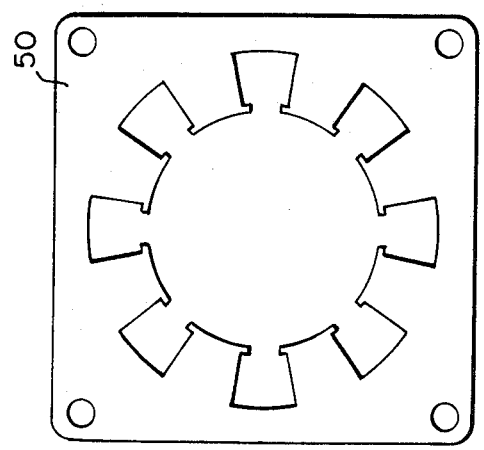
FIG. 16A shows in end view a practical construction of stator lamination for a motor having a skewed pole rotor in accordance with FIGS. 15A and 15B.
Figure 17:
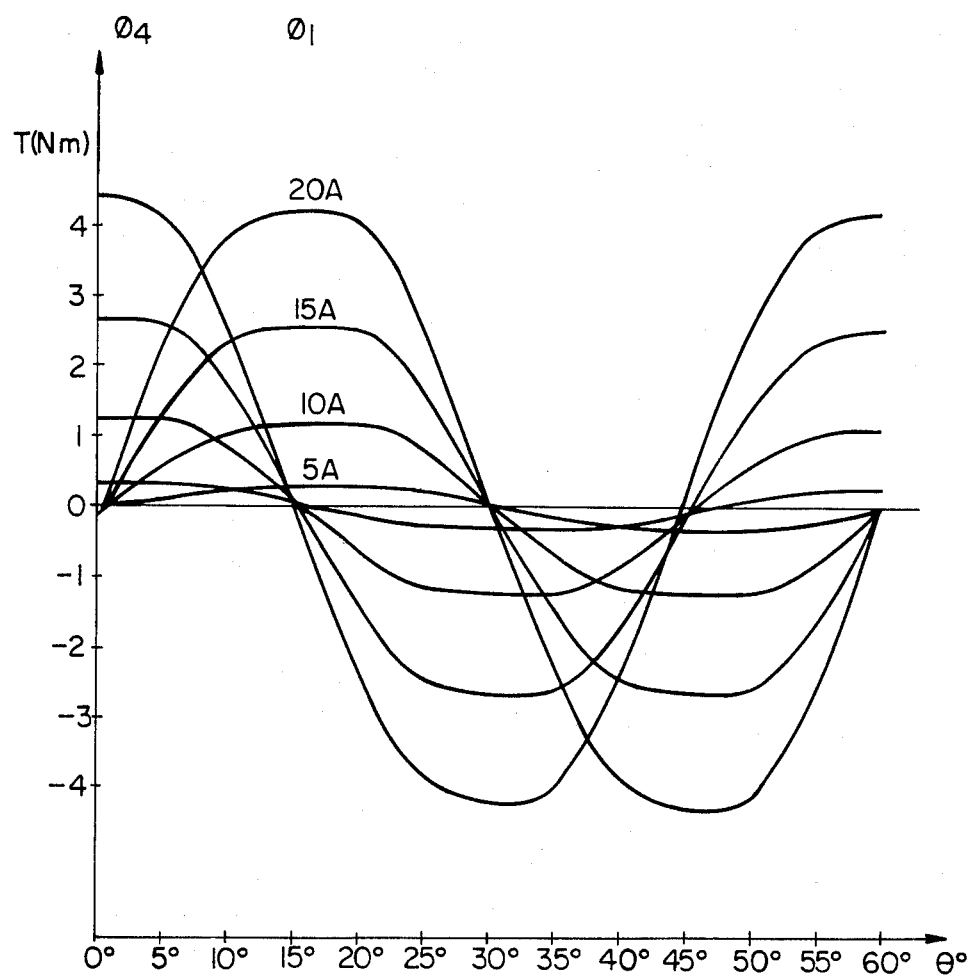
FIG. 17 shows static torque against rotor angle curves for two adjacent phases of a variable reluctance motor having a skewed rotor according to FIGS. 15A and 15B, for different levels of exciting current.

FIG. 16B shows a practical construction of rotor lamination 49 suitable for the rotor of FIGS. 15A and 15B, and an associated stator lamination 50 is shown in FIG. 16A. FIG. 17 shows the torque/rotor angle curves for the machine construction of FIGS. 15A, 15B, 16A and 16B at a variety of levels of phase current, the rotor being skewed in accordance with FIGS. 15A and 15B. It will be seen that at a low value of phase current, a somewhat trapezoidal static torque waveform is produced, although the initial rising portion tends to roll off towards the constant torque portion rather than to rise towards it in a wholly linear manner. At higher values of phase current, the flat-topped portion of the curve becomes less significant and the curved nature of the rising and falling portions of the curve becomes even more apparent. At a large value of phase current, the similarity of the static torque curves to a sinewave becomes particularly marked. The curves of FIG. 17 relate to a construction of machine which is less than ideal in terms of specific output but the shapes of the static torque curves for all machines having similarly skewed rotor poles reflect the same features as those shown, irrespective of the performance of the motor. The similarity of the static torque characteristics to a sinewaves leads to a further strategy for producing smooth operation of a variable speed reluctance motor and one which yields a preferred system according to the present invention. This strategy is illustrated for a four-phase machine in FIG. 18. The static torques (t) for phases A and B are sinusoidal and each phase is then driven with a complementary sinusoidal exciting current (i). Accordingly the motor phase torques (T) under operating conditions are then sine squared curves, which may be shown graphically by plotting static torque curves for different levels of phase current and transferring the appropriate torque values corresponding to the current in each phase at successive angular positions of the rotor onto the motor torque diagram to define the phase torques in operation. Considered in mathematical terms the static torques $t_A$, $t_B$ etc. may be described by $$t_A = K_t I \cdot \text{SIN}(\theta)$$

and $$t_B = K_t I \cdot \text{Sin}(\theta + 90°) = K_t I \cdot \text{Cos}(\theta)$$

etc. where $K_t$ is a motor constant, so that for phase currents $i_A$ and iB, where $$i_A = I_p \cdot \text{Sin}(\theta)$$

and $$i_B = I_p \cdot \text{Cos}(\theta,$$

etc.

$I_p$ being the peak current, the phase torques ($T_A$, $T_B$, etc.) in operation of the motor will be $$T_A = K_t I_p \cdot \text{Sin}^2(\theta)$$

and $$T_B = K_r I_p \cdot \cos^2(\theta),$$

etc.

Figure 18:
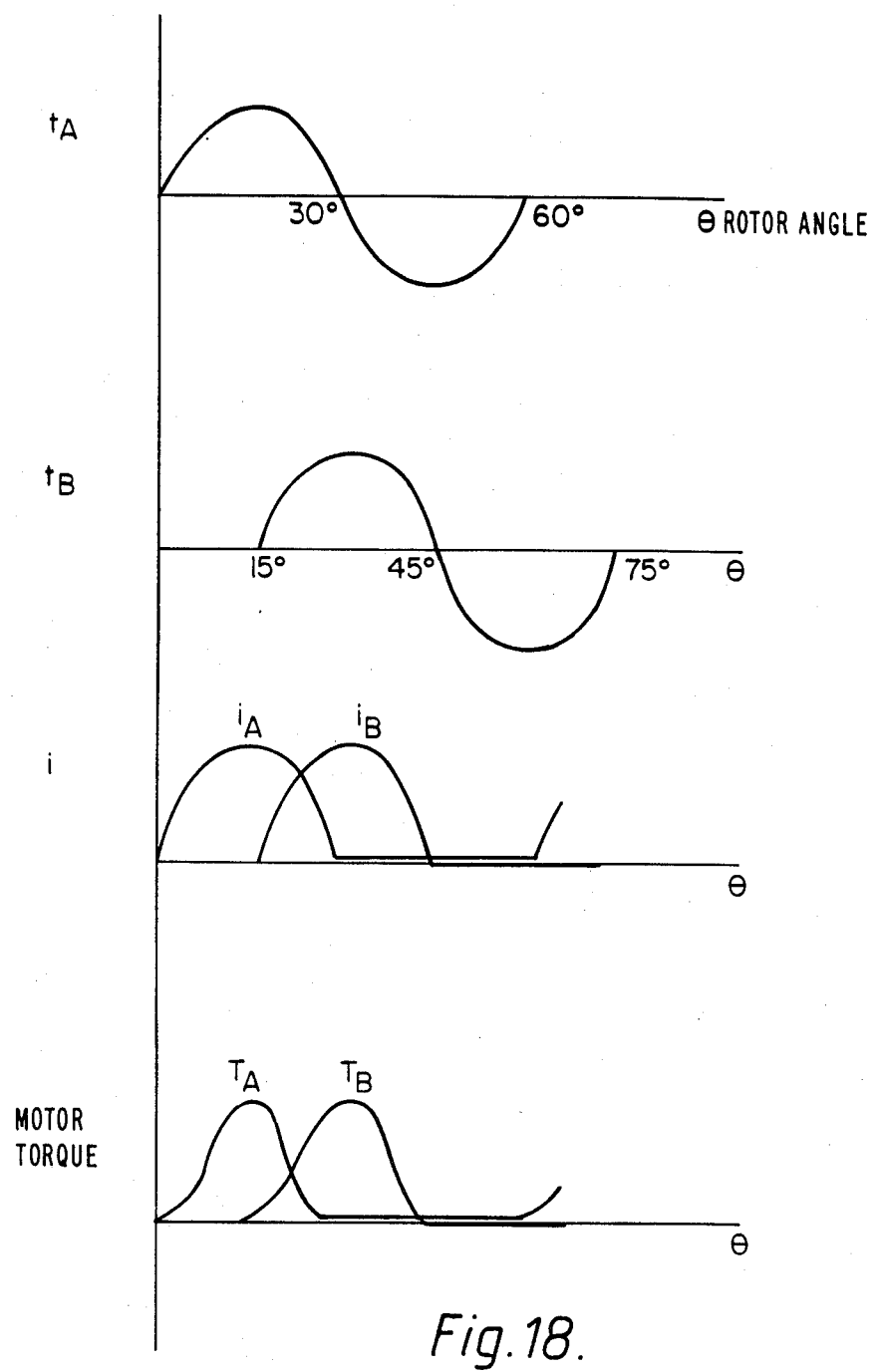
FIG. 18 is a diagram similar to FIG. 13 showing sinusoidal static torque versus rotor angle characteristics for two phases of a variable reluctance motor, half-wave sinusoidal current waveforms for energizing these phases and the resultant phase torque outputs from the motor in operation for these phases when thus energized.

Thus the 90° phase displacement between phase A and phase B as shown in FIG. 18 means that if the phase torque in operation of the motor for phase A is proportional to the sine squared, then that for phase B is proportional to cosine squared. Assuming operation in the saturated region and similar magnetic circuit conditions for each phase, the torque exerted by the motor during transition between phases will then remain constant, since the sum of the squares of the sine and cosine of the same angle equates to unity. This stratety is favoured over the supply of trapezoidal waveforms in that sinusoidal waveshapes have slower rates of changes than do step or trapezoidal waveforms at their abrupt transition points, and sharp changes of torque may therefore be avoided. In addition to this, a machine having a skewed rotor and fed with corresponding sinusoidal energizing currents is significantly quieter than known machines of traditional construction, while since current is applied to the windings only when it is capable of doing useful work by developing torque, and also at all times when it is so capable, there is better copper utilizing than in a machine with conventional poles, as well as reduced copper losses.

Figure 19B:
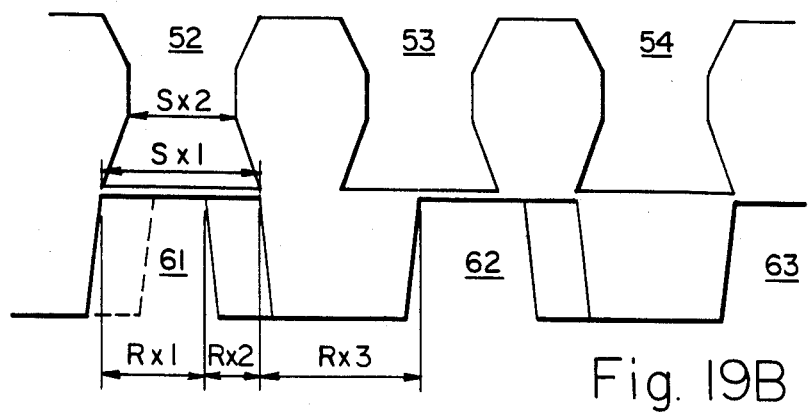
FIG. 19A is an end view of a practical construction of a skewed rotor and its associated stator showing an especially advantageous inter-relationship between rotor and stator for the VRM of a drive system according to FIG. 12.
Figure 19A:
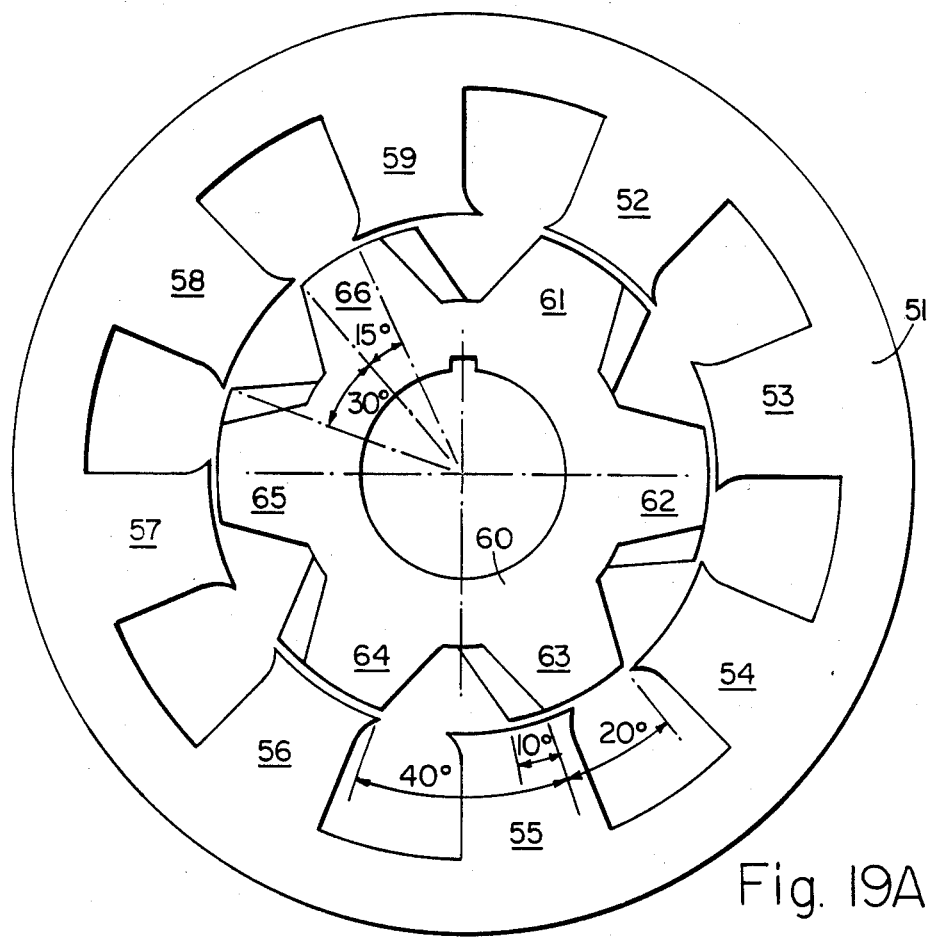

FIGS. 19A and 19B show a particularly advantageous arrangement of skewed rotor and its relationship with a stator, in a system embodying the principles of the invention, together with a development in transverse view of some the poles of the rotor and stator to illustrate preferred circumferential dimensional relationships. It will also be apparent from this Figure that the poleface surfaces of the driving or stator poles define substantially continuous surfaces facing the airgap, as compared with the toothed poleface structure of the permanent magnet stepping motor shown in FIG. 11. The stator 51 has eight poles 52 to 59, each of which extends over an arcuate extent of 30° and is spaced from its neighbours by a gap of 15°. The rotor 60 has six poles 61 to 66 and is formed of a stack of laminations, the arcuate extent of each outer peripheral portion of each pole being 20°, and each such outer peripheral portion being separated from that of the next pole by a gap of 40°. The rotor has a skew of 10°. Accordingly the total arcuate extent of the envelope occupied in space by each rotor pole between its most leading edge portion and its most trailing edge portion is 30°, i.e. the same arcuate dimension as each stator pole. Similarly the arcuate extent of the gap between the rearmost part of the rearmost lamination of each rotor pole and the foremost part of the leading lamination of the following pole is also 30°. Accordingly, when one pair of rotor poles, 61 and 64, is aligned with stator poles 52 and 56 as shown in FIG. 19, the iron of the rotor poles is positioned exactly beneath the iron of the stator poles, with no part of the rotor pole lying outboard of the stator pole or vice versa.

Similarly the gaps between poles 62 and 63 and 65 and 66 respectively are precisely aligned with poles 54 and 58, with no rotor iron whatever underlying these stator poles. This inter-relationship between rotor and stator gives especially efficient transition between phases, and the static phase torque characteristics do not exhibit the zero torque deadband portions shown on the characteristics of, for example, FIG. 7. A further advantageous feature of the rotor lamination of FIGS. 19A and 19B is the tapering of the rotor poles in an outward direction from their bases, where they merge into the central circularly apertured part of the lamination by which the lamination is receive on the motor shaft.

Pole taper is an especially advantageous feature of particular embodiments of the motor of the invention described herein, namely radially outward taper on the rotor poles, so that these poles narrow towards their tips, and a widening of the stator poles towards their radially inner tips, so that the pole faces of the rotor and stator may be in substantial overlying alignment, in a preferred construction and a given angular relationship.

Referring to the development of these poles shown in FIG. 19B, Rx1, the lamination span, plus Rx2, the skew, together sum to the rotor pole span at the pole tip, and $$Rx1 + Rx2 = Sx1$$

where Sx1 is the stator pole span at the pole tip. Rx3, the rotor interpole gap between rotor pole tips, also equates to Sx1. Because of the rotor pole skew, the stator pole tip does not entirely cover or overlie rotor iron when the rotor and stator poles are aligned. Accordingly the stator pole tip is of greater size than the magnetic circuit strictly requires and it tapers inwardly to a reduced cross-section or waist, Sx2, located between the pole tip and the base of the pole, Sx2 being less than Sx1. This waisting of the stator poles gives increased copper area or space.

The skew is defined by the ratio of Rx2 to Rx1. In a preferred construction, $$Rx2/Rx1 = \tfrac{1}{2}$$

In a four-phase machine, this skew ratio has the surprising result of giving good sinusoidal static torque characteristics without significantly affecting or reducing the net torque output of the machine. In a three-phase machine, where flat-topped sinusoids are required, this skew ratio is typically less than $\tfrac{1}{2}$.

While this aspect of the invention has been described with particular relevance to an eight stator pole, six rotor pole arrangement, it is in no way limited to such a construction and greater or lesser numbers of poles may also be used. Also in addition to the one tooth per pole constructions of rotor and stator already described and illustrated, each pole face may be divided to provide two or more teeth, and this may be advantageous in certain circumstances.

Figure 20:
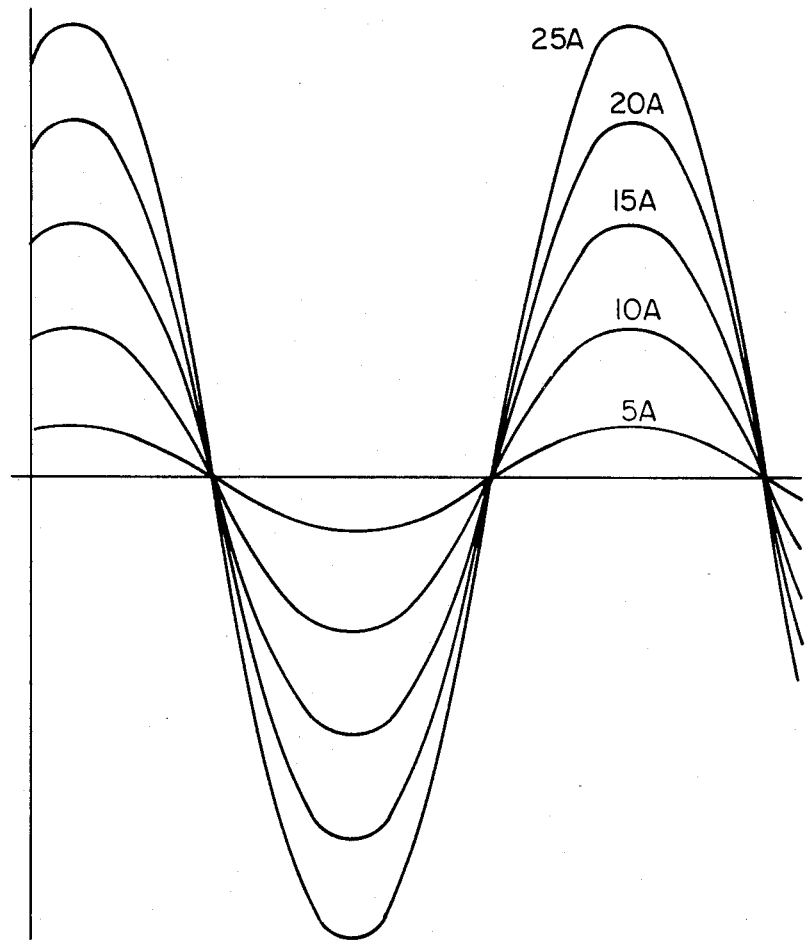
FIG. 20 shows curves plotting static torque against rotor angle for one phase of the motor construction of FIG. 19A, at varying levels of energizing.

FIG. 20 shows static torque characteristics at a variety of current levels for a rotor having laminations in accordance with FIG. 19. The sinusoidal nature of these characteristics will be especially apparent in this construction which has a favoured relationship between the rotor and stator pole arcuate extents.

The skewed rotor construction described in relation to inter alia the preceding FIGS. 15A, 15B, 16A, 16B, 19A and 19B is especially applicable to a drive system according to the invention in which sinusoidal current waveshapes are input to the stator windings. It is however also usable with other waveforms of stator current and is not necessarily limited to sinusoids. It will be particularly apparent from the static torque against rotor angle characteristics shown in FIG. 20 that the characteristics achieved by rotor skewing are also substantially symmetrical, which is especially advantageous in a bidirectional motor, whether in conjunction with current shaping or not. The angle of skew has been found to be significant and a favoured degree of skew is shown in the preferred construction of FIGS. 19A and 19B.

Figure 21:
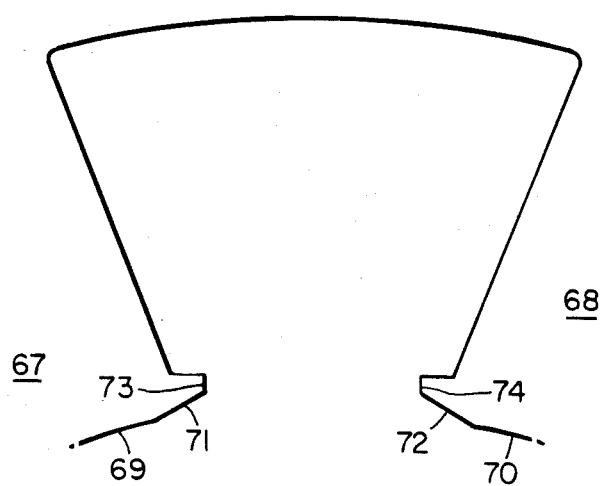
FIG. 21 is a partial end view of a stator lamination in which the edge regions of the polefaces are shaped to provide a modified static torque against rotor angle characteristic.

However the drive system of the invention as described in relation to FIG. 12 may also advantageously be associated with the alternative form of pole shaping shown in FIG. 21. Two adjacent stator poles 67 and 68 each have respective polefaces 69 and 70. The central regions of these polefaces are disposed at a constant airgap from the path traversed by rotor polefaces passing beneath them but in their edge regions, the polefaces have respective profiled surface portions 71 and 72 where the airgap increases circumferentially outwardly of the pole by virtue of the poleface surfaces in these edge regions being progressively set back from a notional circumferential continuation of the central regions of the polefaces of the respective poles. Thus each poleface has profiled surface portions in its edge regions, so that the airgap between the stator pole and an aligned rotor pole is greater along the edges of the stator pole, as compared with its central region. At the circumferentially outward ends of these edge regions, the polefaces end at tips 73 and 74, where the poleface surfaces merge with radial surfaces extending into the interpole spaces where the windings are received. Pole shaping of this kind also achieves a reduction in the rate of torque changes, especially on initial overlap, and in particular in conjunction with current shaping, enables the torque transitions to be smoothed and noise and vibration in operation of the machine to be substantially minimized. In addition, each stator poleface can be seen to have a substantially continuous surface without abrupt changes of profile in the arrangement shown in FIG. 21.

A particular and surprising feature of the invention is the reduction in noise production when the phase windings are connected in parallel rather than in series. In a series connection, the magnetomotive forces in the air gaps are equated, and the fluxes are determined by the air gaps themselves, so that any differences between the air gaps will lead to unbalanced fluxes. By connecting the phases in parallel, equal fluxes are forced on opposite poles and the displacement forces generated are substantially equal. A motor according to the invention may also incorporate a field coil, which excites all phases equally and may be used to modify the non-linear torque-current characteristics of the phases so that they become substantially linear over the normal operating range of the motor.

Figure 22:
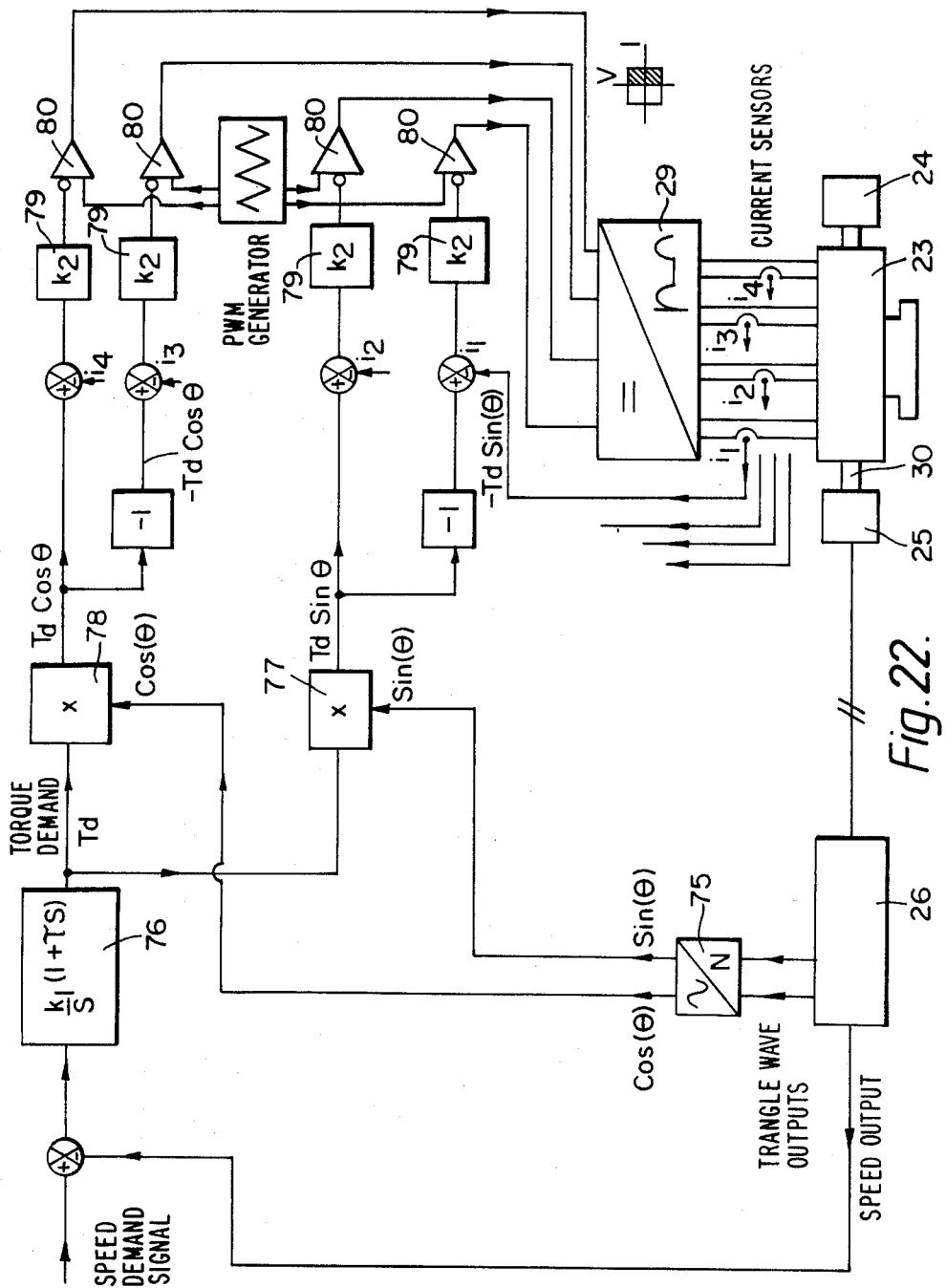
FIG. 22 is a schematic diagram of an analogue realization of a drive system according to the invention.

FIG. 22 shows in schematic diagrammatic form, an analogue circuit arrangement especially suitable for but not limited to a six rotor pole, eight stator pole motor having skewed poles and a substantially sinusoidal static torque against rotor angle characteristic. The same reference numerals as those of FIG. 12 are used for similar items. The sensor 25 is arranged to have an output which is in the form of two triangular waveforms in quadrature and cyclic in 60° mechanical. These signals are converted to sinusoidal waveforms by converters 75, giving sine and cosine waves. These sine and cosine waves serve to from correct reference current waveshapes for achieving smooth torque output in this embodiment.

Since positive and negative torque is created in the reluctance motor depending on the rotor position when each phase winding is energized, if a positive half-sinewave is associated with phase 1 for positive torque, then the inverted negative half cosine wave must be associated with phase 2, the inverted negative sine half-wave with phase 3 and the positive cosine half-wave with phase 4. For negative torque, the phase sequence is inverted negative half-sinewave, positive cosine half-wave, positive sine half-wave and inverted negative cosine half-wave. Since only unidirectional currents are required in each phase, the two-quadrant power controller is arranged to respond to current in one direction only, so that its output is one half-cycle for each of the full waveforms applied to it, and each phase is energized in turn by half waves of the same polarity.

In FIG. 22, a further output from the sensor interface 26 provides a speed output signal which is associated with a speed demand signal to provide an input to a speed controller 76, the output of which is a torque demand signal. This torque demand signal is applied along with one of the sine or cosine waves generated by the converters 75 to respective analogue multipliers 77 and 78. The output of multiplier 77 is then a sine wave and that of multiplier 78 a cosine wave, the relative instantaneous magnitudes of these output signals following the sine and cosine waves determined by the converters 75 while their absolute magnitudes are set by the torque demand signal. In the case of regular sinewaves used in the present construction of control systems, this torque demand signal may be the peak value of the wave, which then determines the current level at all other points along the waves, but this is not necessarily the case for other waveforms. Following the analogue multipliers, the sine wave and cosine wave are each paralleled by an inverted sine and cosine wave respectively and these four signals are applied to current controllers 79, in which current feedback signals from the phase windings are associated with the sine and cosine signals to provide actual current demand signals for the power converter 29. The final output signals from the current controllers 79 are applied to comparators 80, which also have high frequency inputs for pulse width modulation in known manner. The PWM input is modulated in each case by the set level signal from the current controller 79 and the resulting outputs provide said current demand signals for the two-quadrant power converter 29.

Figure 23:
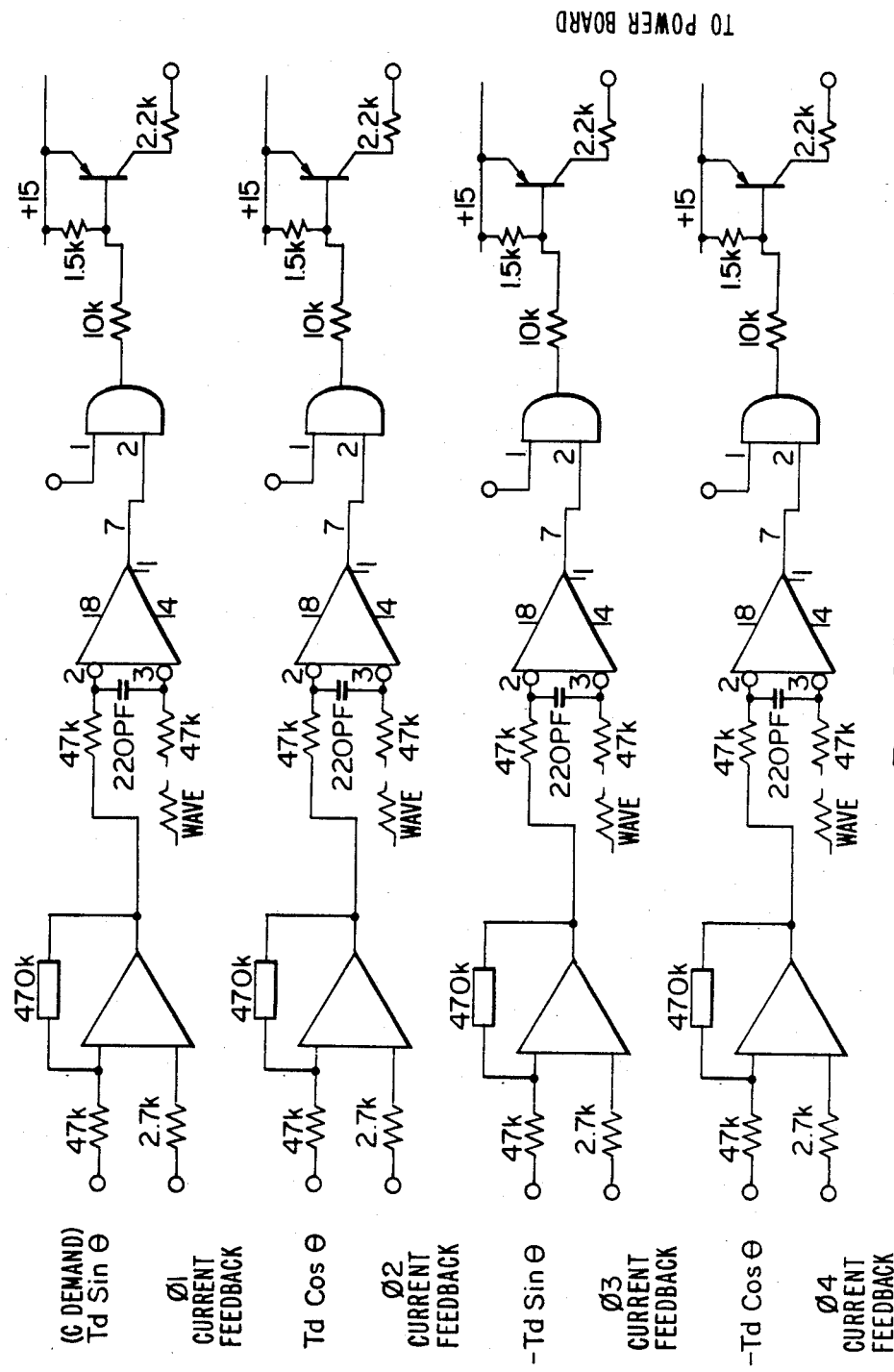
FIG. 23 is a circuit diagram of current regulators or controllers for the drive system of FIG. 22.
Figure 24:
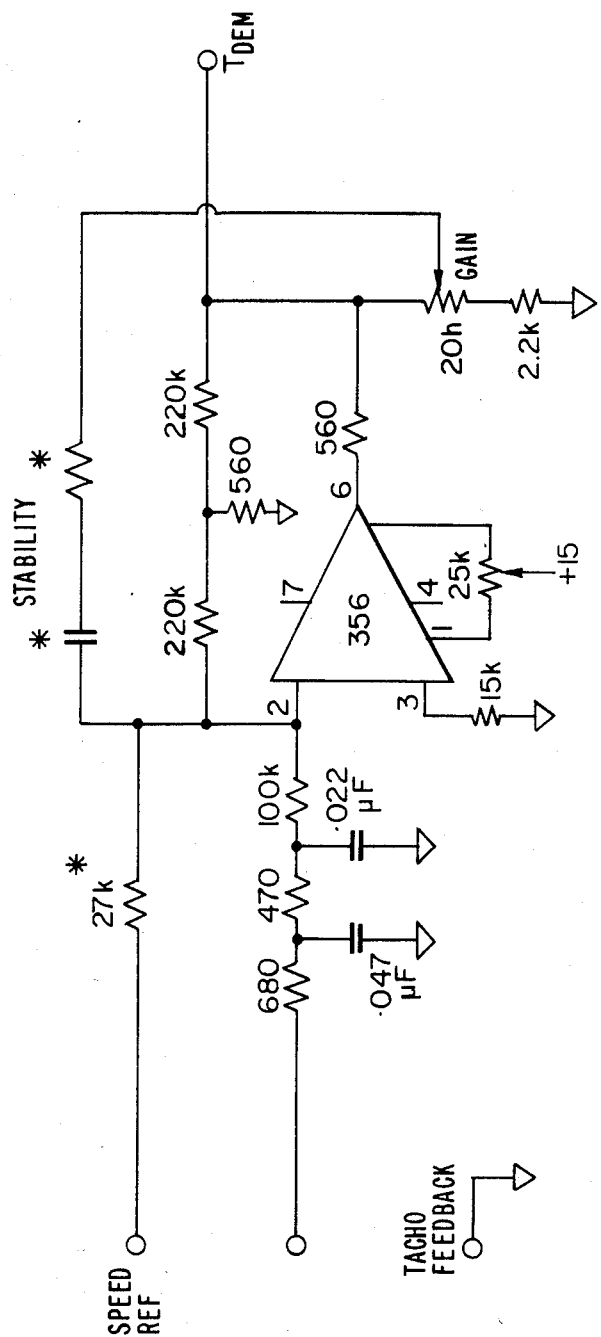
FIG. 24 is a circuit diagram of a speed regulator or controller for the drive system of FIG. 22.
Figure 25:
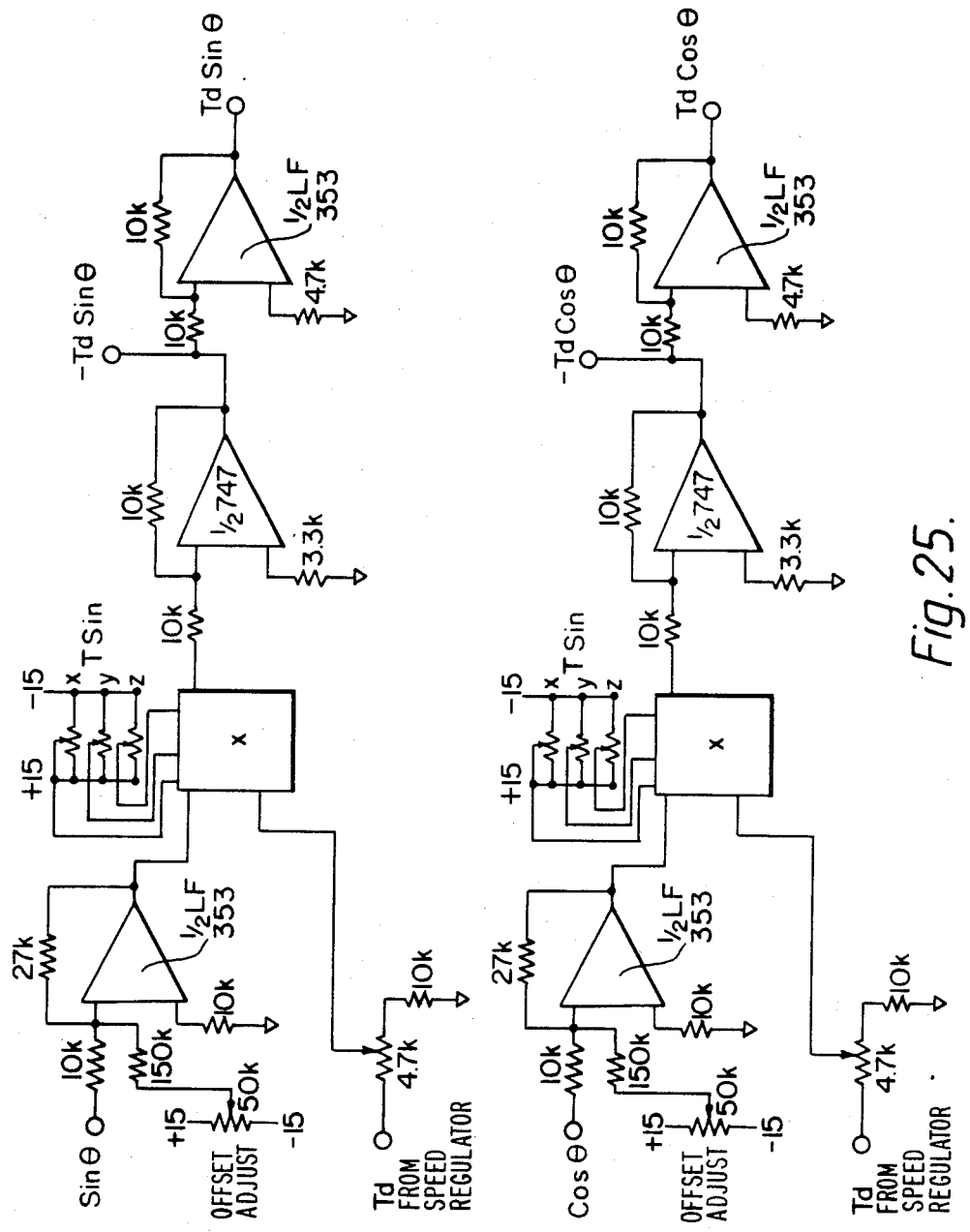
FIG. 25 is a circuit diagram of multipliers for the drive system of FIG. 22.
Figure 26:
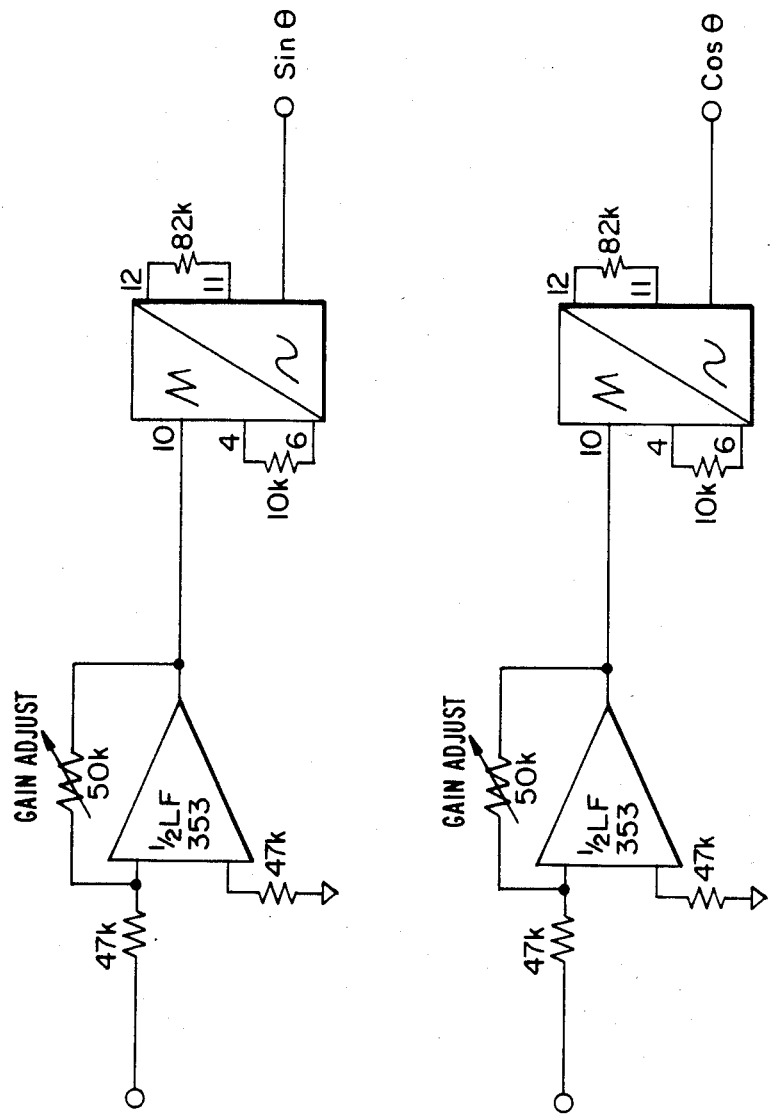
FIG. 26 is a circuit diagram of a signal conditioner for the speed signals in the drive system of FIG. 22.

FIGS. 23 to 26 are circuit diagrams of exemplifications of certain of the components or units of the drive system of FIG. 22. FIG. 23 shows the current regulators or controllers 79, while FIG. 24 shows the speed controller or regulator 76. The multipliers 77 and 78 are illustrated in FIG. 25, and the sensor signal interface or triangle-sine converters 75 are depicted in FIG. 26. The detailed operation of these circuits will be apparent from the Figures and is accordingly not the subject of detailed description herein.

Figure 27:
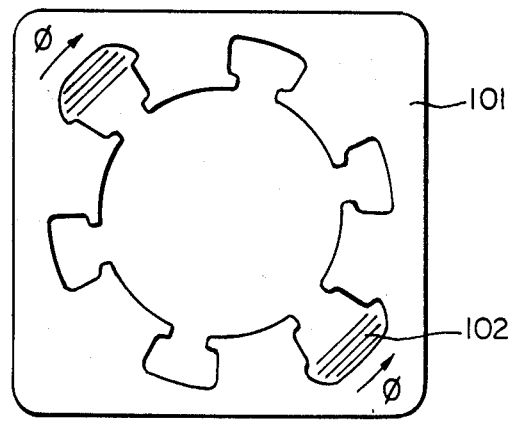
FIG. 27 shows a lamination of a stator construction for a generator in accordance with the invention.

In FIG. 27, a generator configuration of stator lamination for a machine according to the invention is shown. Lamination 101 has six stator poles for operation with a four-pole rotor. Two of the interpole spaces which receive the stator windings are enlarged to accommodate a field winding, indicated by reference 102. When energized, this field winding sets up a constant flux, indicated by $\phi$ in the Figure, which divides between the three phases of the machine on the basis of their relative reluctances. As the rotor rotates, the relative permeance of the phases changes, so that flux linkages of the phase windings also change and accordingly phase voltages are produced. The structural features, viz. skewing etc., applicable to variable reluctance motors according to the invention in order to shape their torque outputs so that the phase torques become substantially sinusoidal functions of rotor angle, may also be applied to shape the voltage output of a generator according to this embodiment of the invention.

Figure 28:
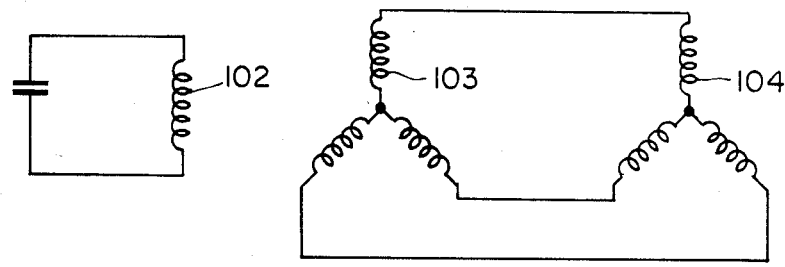
FIG. 28 is a schematic diagram of a system incorporating a generator according to the invention.

FIG. 28 shows a schematic diagram of a three-phase generator according to this aspect of the invention, in which the field winding 102 is energized by a DC source and the three phase windings 103 are connected in star to the three phases of a load 104.

We claim:

1. A drive system comprising a saturable variable reluctance electrical motor, said motor comprising a stationary or driving member having a plurality of salient driving poles, a magnetizing winding for each driving pole, and a movable or driven member having a plurality of salient driven poles, the number of driven poles being less than the number of driving poles, and a plurality of airgaps, the airgap between each driving pole and a driven pole positioned in alignment therewith being small relative to the dimensions of the poles transverse to said airgap and at least the driven poles being formed so that in operation of the motor magnetic saturation occurs substantially in a region of the mechanically variable interface or overlap between the driving and driven poles, and the extents and dispositions of the driven poles being related to those of the driving poles so that in operation of the motor, a force-producing increment of driven member displacement resulting from the mechanical interface or overlap of each driven pole with a driving pole overlaps a force-producing increment of driven member displacement resulting from the overlap of another driven pole with a further driving pole, and the system also comprising power supply means including voltage source means for connection across the driving pole windings, said windings being connectible across said voltage source means in a predetermined sequence during driven member displacement and each driving pole winding being thus connectible for a predetermined increment of driven member displacement, so that the driving poles may be sequentially energized for displacement of the driven member between successive minimum reluctance positions, and driven member position-sensing means for generating at least one signal, the instantaneous value of which is dependent on the position of the driven member for providing driven member position information at a succession of intervals within each said predetermined increment of driven member displacement during which a driving pole winding is connectible to said voltage source means, and the power supply means also including means for regulating the instantaneous magnitude of the current in a driving pole winding when connected to said voltage source means, said current-regulating means being responsive to said at least one driven member position-dependent signal of the driven-member position-sensing means to regulate said current magnitude so that the instantaneous value of said current set by said regulating means at any position of the driven member within said increment of driven member displacement during which the winding is connectible to said voltage source means relative to its value at any other said position is substantially determined by the instantaneous position of the driven member within said increment.

2. A drive system according to claim 1, wherein the poleface of at least each driving pole defines a substantially continuous surface facing said airgap.

3. A drive system comprising a saturable variable reluctance electrical motor, said motor comprising a stator having a plurality of salient stator poles, a magnetizing winding for each stator pole, and a rotor having a plurality of salient rotor poles, the number of rotor poles being less than the number of stator poles, a radial airgap between each stator pole and a rotor pole positioned in alignment therewith being small relative to the dimensions of the poles transverse to said airgap and at least the rotor poles being formed so that in operation of the motor, magnetic saturation occurs substantially in a region of the mechanically variable interface or overlap between the stator and rotor poles, and the arcuate extents and dispositions of the rotor poles being related to those of the stator poles so that in operation of the motor, a torque-producing angular increment of rotor rotation resulting from the mechanical interface or overlap of each rotor pole with a stator pole overlaps a torque-producing angular increment of rotor rotation resulting from the overlap of another rotor pole with a further stator pole, and the system also comprising power supply means including voltage source means for connection across the stator pole windings, said windings being connectible across said voltage source means in a predetermined sequence during rotor rotation and each stator pole winding being thus connectible for a predetermined angular increment of rotor rotation, so that the stator poles may be sequentially energized for rotation of the rotor between successive minimum reluctance positions, and rotor position-sensing means for generating at least one signal, the instantaneous value of which is dependent on the position of the rotor for providing rotor position information at a succession of intervals within each said predetermined angular increment of rotor rotation during which a stator pole winding is connectible to said voltage source means, and the power supply means also including means for regulating the instantaneous magnitude of the current in the stator winding when connected to said voltage source means, said current-regulating means being responsive to said at least one rotor position-dependent signal of the rotor position-sensing means to regulate said current magnitude so that the instantaneous value of said current set by said regulating means at any angular position of the rotor within said angular increment of rotor rotation during which the winding is connectible to said voltage source means relative to its value at any other said angular position is substantially determined by the instantaneous angular position of the rotor within said angular increment.

4. A drive system according to claim 3, wherein the poleface of at least each stator pole defines a substantially continuous surface facing said airgap.

5. A drive system according to claim 3, wherein said current-regulating means is responsive to said rotor-position dependent signal to regulate said current magnitude so that successive instantaneous values of said current during said initial portion of said angular increment of rotor rotation during which the winding is connectible to said voltage source means increase progressively with progressive rotation of the rotor and successive instantaneous values of said current during a terminal portion of said angular increment decrease progressively with said progressive rotation.

6. A drive system according to claim 5, wherein said current-regulating means is responsive to said rotor-position dependent signal to regulate said current magnitude so that the rate at which successive instantaneous values of said current decrease during said terminal portion of said angular increment of rotor rotation is substantially the same as the rate of increase of successive instantaneous current values during said initial portion and the succession of instantaneous current values over said angular increment of rotor rotation substantially defines a substantially symmetrical current waveshape extending over said angular increment.

7. A drive system according to claim 6, wherein said current magnitude remains substantially constant during a portion of said angular increment of rotor rotation following said initial portion, said portion ending with the commencement of said terminal portion.

8. A drive system according to claim 6, wherein said current-regulating means is responsive to said rotor-position dependent signal to regulate said current magnitude so that said instantaneous current values during said angular increment of rotor rotation substantially define a substantially sinusoidal halfwave.

9. A drive system according to claim 3, further comprising means for producing a demand signal, the value of which is indicative of a desired level of a parameter of motor performance, said current-regulating means also being responsive to said parameter-level-indicative signal to regulate said stator winding current so that the absolute magnitude of said current at every angular position of the rotor within said angular increment of rotor rotation during which the winding is connectible to said voltage source means is substantially determined by the value of said parameter-level-indicative signal.

10. A drive system according to claim 3, wherein each rotor pole and each stator pole has circumferentially spaced apart edge regions and at least said rotor pole edge regions are shaped so that at least the axial extent of the airgap between overlapping rotor and stator poles will vary at least during the commencement of pole overlap.

11. A drive system according to claim 10, wherein the rotor comprises a plurality of laminations and each said edge region is defined in the axial direction of the pole by a succession of edge region portions, and each lamination is circumferentially displaced relative to an adjacent lamination so that said edge region is skewed relative to the axis of rotation of the rotor.

12. A drive system according to claim 3, wherein each rotor pole and each stator pole has circumferentially spaced apart edge regions and at least said rotor pole edge regions are shaped so that at least the radial dimension of the airgap will vary at least during the commencement of pole overlap.

13. A drive system according to claim 12, wherein surface portions of the poleface of at least each rotor pole in said edge regions are radially displaced relative to the central surface portion of the poleface so that the airgap between an edge region surface portion of the poleface and the poleface of an aligned pole is greater than the airgap between the central surface portion of the poleface and the poleface of an aligned pole.

14. A drive system comprising a saturable variable reluctance electrical motor, said motor comprising a stator having a plurality of salient stator poles, a magnetizing winding for each stator pole, and a rotor having a plurality of salient rotor poles, the number of rotor poles being less than the number of stator poles, a radial airgap between each stator pole and a rotor pole positioned in alignment therewith being small relative to the dimensions of the poles transverse to said airgap and at least the rotor poles being formed so that in operation of the motor magnetic saturation occurs substantially in a region of the mechanically variable interface or overlap between the stator and rotor poles, and the arcuate extents and dispositions of the rotor poles being related to those of the stator poles so that in operation of the motor, a torque-producing angular increment of rotor rotation resulting from the mechanical interface or overlap of each rotor pole with a stator pole overlaps a torque-producing angular increment of rotor rotation resulting from the overlap of another rotor pole with a further stator pole, and the system also comprising rotor position-sensing means for generating at least one signal, the instantaneous value of which is dependent on the angular position of the rotor, and power supply means including voltage source means for connection across the stator pole windings, said windings being connectible across said voltage source means in a predetermined sequence during rotor rotation and each stator pole winding being thus connectible for a predetermined angular increment of rotor rotation, and the power supply means also including means for regulating the instantaneous magnitude of the current in a stator winding when connected to said voltage source means, said current-regulating means being responsive to said at least one rotor position-dependent signal of the rotor position-sensing means to regulate said current magnitude so that the instantaneous value of said current set by said regulating means at any angular position of the rotor within said angular increment of rotor rotation during which the winding is connectible to said voltage source means relative to its value at any other said angular position is substantially determined by the instantaneous angular position of the rotor, each rotor pole and each stator pole having circumferentially spaced apart edge regions, the circumferential spacing of said edge regions of each pole being substantially constant throughout the axial extent of the pole and one axial end of each of said edge regions of at least each rotor pole having a circumferential displacement relative to the other axial end of the same edge region of the pole of between one quarter of the constant circumferential spacing of the edge regions of the pole and a value equal to said spacing, so that said edge region is skewed relative to the axis of rotation of the rotor.

15. A drive system comprising a saturable variable reluctance electrical machine, said electrical machine comprising a stator having a plurality of salient stator poles, a winding for each stator pole, and a rotor having a plurality of salient rotor poles, the number of rotor poles being less than the number of stator poles, a radial airgap between each stator pole and a rotor pole positioned in alignment therewith being small relative to the dimensions of the poles transverse to said airgap and at least the rotor poles being formed so that in operation of the machine, magnetic saturation occurs substantially in, a region of the mechanically variable interface or overlap between the stator and rotor poles, and the arcuate extents and dispositions of the rotor poles being related to those of the stator poles so that in operation of the machine, a torque-producing angular increment of rotor rotation resulting from the mechanical interface or overlap of each rotor pole with a stator pole overlaps a torque-producing angular increment of rotor rotation resulting from the overlap of another rotor pole with a further stator pole, and the system also comprising voltage source means connectible across stator pole windings, said windings being connectible across said voltage source means in a predetermined sequence during rotor rotation and each stator pole winding being thus connectible for a predetermined angular increment of rotor rotation, and rotor position-sensing means for generating at least one signal, the instantaneous value of which is dependent on the position of the rotor for providing rotor position information at a succession of intervals within each said predetermined angular increment of rotor rotation during which a stator pole winding is connectible to said voltage source means, and said windings also being connectible across an electrical load during rotor rotation, also in a predetermined sequence, and each stator pole winding being thus connectible for a predetermined further angular increment of rotor rotation.

16. A saturable variable reluctance machine according to claim 15, wherein the stator pole windings are accommodated in interpole spaces defined between the stator poles and at least one of said spaces also accommodates a field winding.

17. A saturable variable reluctance electrical machine comprising a stationary or driving member having a plurality of salient driving poles, a winding for each driving pole, a movable or driven member having a plurality of driven poles, the number of driven poles being less than the number of driving poles, and a plurality of airgaps, the airgap between each driving pole and a driven pole positioned in alignment therewith being small relative to the dimensions of the poles transverse to said airgap and at least the driven poles being formed so that in operation of the machine, magnetic saturation occurs substantially in a region of the mechanically variable interface or overlap between the driving and driven poles, the extents and dispositions of the driven poles being related to those of the driving poles so that in operation of the machine, a force-producing increment of driven member displacement resulting from the mechanical interface or overlap of each driven pole with a driving pole overlaps a force-producing increment of driven member displacement resulting from the overlap of another driven pole with a further driving pole, each driven pole and each driving pole having edge regions spaced apart in the direction of relative displacement of the driven and driving members, said spacing of said edge regions being substantially constant throughout the extent of the pole in a direction transverse to said direction of relative displacement and one transverse end of each said edge region of at least each driven pole being displaced in said direction of relative displacement with respect to the other transverse end of said edge region by between one quarter of the constant extent of the pole in said direction of relative displacement and a value equal to said extent so that said edge region is skewed relative to said direction of relative displacement.

18. A saturable variable reluctance electrical machine comprising a stator having a plurality of salient stator poles, a winding for each stator pole, a rotor having a plurality of rotor poles, the number of rotor poles being less than the number of stator poles, a radial airgap between each stator pole and a rotor pole positioned in alignment therewith being small relative to the dimensions of the poles transverse to said airgap and at least the rotor poles being formed so that in operation of the machine, magnetic saturation occurs substantially in a region of the mechanically variable interface or overlap between the stator and rotor poles, the arcuate extents and dispositions of the rotor poles being related to those of the stator poles so that in operation of the machine, a torque-producing angular increment of rotor rotation resulting from the mechanical interface or overlap of each rotor pole with a stator pole overlaps a torque-producing angular increment of rotor rotation resulting from the overlap of another rotor pole with a further stator pole, each rotor pole and each stator pole having respective circumferentially spaced apart edge regions, the circumferential spacings of said edge regions being substantially constant throughout the axial extent of the pole and one axial end of each said edge region of at least each rotor pole being circumferentially displaced relative to the other axial end of said edge region by between one quarter of the constant arcuate extent of the pole and a value equal to said arcuate extent so that said edge region is skewed relative to the axis of rotation of the machine.

19. A saturable variable reluctance electrical machine according to claim 18, wherein said circumferential displacement between said axial ends of said edge region is approximately one-half of said arcuate extent.

20. A saturable variable reluctance electrical machine according to claim 18, wherein said circumferential displacement between said axial ends of said edge region subtends an angle at the rotor axis of not less than 5°.

21. A saturable variable reluctance electrical machine according to claim 18, wherein the winding of one stator pole is connected in parallel with the winding of at least one other stator pole, said windings together defining a phase of the machine.

22. A saturable variable reluctance machine according to claim 18, wherein the circumferential extent of each stator pole tip is greater than the circumferential extent of a waist portion of the stator pole located between the pole tip and the base of the pole.

23. A saturable variable reluctance machine according to claim 22, wherein the sum of the span of each rotor pole tip and said circumferential displacement between said axial ends of the edge region of each rotor pole is approximately equal to the stator pole tip span.

* * * * *